(12) United States Patent
Iijima et al.

(10) Patent No.: US 12,546,233 B2
(45) Date of Patent: Feb. 10, 2026

(54) TURBINE ASSEMBLY AND METHOD FOR ASSEMBLING TURBINE ASSEMBLY

(71) Applicant: MITSUBISHI HEAVY INDUSTRIES, LTD., Tokyo (JP)

(72) Inventors: Takayoshi Iijima, Kanagawa (JP); Shingo Yamasue, Kanagawa (JP); Yuma Matsuo, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 18 days.

(21) Appl. No.: 18/568,669

(22) PCT Filed: Jun. 7, 2022

(86) PCT No.: PCT/JP2022/022871
§ 371 (c)(1),
(2) Date: Dec. 8, 2023

(87) PCT Pub. No.: WO2022/264865
PCT Pub. Date: Dec. 22, 2022

(65) Prior Publication Data
US 2024/0271546 A1    Aug. 15, 2024

(30) Foreign Application Priority Data

Jun. 16, 2021 (JP) .................. 2021-100323

(51) Int. Cl.
| | | |
|---|---|---|
| F01D 25/12 | (2006.01) | |
| F01D 25/24 | (2006.01) | |
| F02C 7/18 | (2006.01) | |

(52) U.S. Cl.
CPC .......... *F01D 25/12* (2013.01); *F01D 25/243* (2013.01); *F02C 7/18* (2013.01); *F05D 2220/32* (2013.01);
(Continued)

(58) Field of Classification Search
CPC .......... F01D 25/12; F01D 25/14; F01D 25/243
See application file for complete search history.

(56) References Cited

U.S. PATENT DOCUMENTS 3,628,884 A * 12/1971 Mierley, Sr. .......... F04D 29/624
   415/199.5
3,937,589 A * 2/1976 Remberg .............. F01D 25/265
   415/214.1
(Continued)

FOREIGN PATENT DOCUMENTS

| JP | 2012-137035 | 7/2012 |
| JP | 2015-78622  | 4/2015 |
(Continued)

OTHER PUBLICATIONS

Office Action issued Jul. 1, 2025 in corresponding Korean Patent Application No. 10-2023-7038485, with machine translation, 10 pages.

*Primary Examiner* — Courtney D Heinle
*Assistant Examiner* — John S Hunter, Jr.
(74) *Attorney, Agent, or Firm* — Wenderoth, Lind & Ponack, L.L.P.

(57) ABSTRACT

This turbine assembly comprises: a first main body provided with a first protrusion constituting a part of an annular body formed annularly around an axis and protruding radially outward and horizontally from the annular body, and a second protrusion projecting radially outward from a position different from that of the first protrusion in the circumferential direction of the annular body; and a first casing provided with a support surface that supports the first protrusion from below, and a first recess that is recessed radially outward and that accommodates the second protrusion, the dimension of the first recess in the axial direction of the annular body being greater than the dimension of the second protrusion, the axis of the annular body being
(Continued)

disposed horizontally, and a gap being formed in the axial direction between the second protrusion and the first recess when the second protrusion is accommodated in the first recess.

18 Claims, 13 Drawing Sheets

(52) U.S. Cl.
CPC ...... *F05D 2230/60* (2013.01); *F05D 2240/14* (2013.01); *F05D 2260/20* (2013.01)

(56) References Cited

U.S. PATENT DOCUMENTS

| | | |
|---|---|---|
| 2013/0230392 A1 | 9/2013 | Hashimoto |
| 2016/0251962 A1 | 9/2016 | Hashimoto |
| 2017/0184031 A1 | 6/2017 | Hashimoto et al. |

FOREIGN PATENT DOCUMENTS

| | | |
|---|---|---|
| KR | 10-2014-0114449 | 9/2014 |
| KR | 10-2016-0146920 | 12/2016 |

\* cited by examiner

ΔW = W1 − W2

MOVING STEP

ROTATING STEP

PIN INSERTING STEP

CLEARANCE MEASURING STEP

INSTALLING STEP

CLEARANCE CONFIRMING STEP

TURBINE ASSEMBLY AND METHOD FOR ASSEMBLING TURBINE ASSEMBLY

TECHNICAL FIELD

The present disclosure relates to a turbine assembly and a method for assembling a turbine assembly.

The present application claims priority based on Japanese Patent Application No. 2021-100323 filed in Japan on Jun. 16, 2021, the contents of which are incorporated herein by reference.

BACKGROUND ART

In a rotary machine such as a gas turbine disclosed in PTL 1, an annular body inside a casing needs to be supported by the casing. In the related art, the annular body is joined to the casing.

CITATION LIST

Patent Literature

[PTL 1] Japanese Unexamined Patent Application Publication No. 2015-078622

SUMMARY OF INVENTION

Technical Problem

However, when the rotary machine is assembled or disassembled, contact (galling) occurs in a part joined by a bolt between the casing and the annular body due to influence of strain, thereby causing a problem.

The present disclosure is made in view of the above-described problem, and an object of the present disclosure is to provide a turbine assembly and a method for assembling a turbine assembly, which can easily assemble and disassemble the turbine assembly.

Solution to Problem

According to the present disclosure, in order to achieve the above-described object, there is provided a turbine assembly including a first main body provided with a first protrusion forming a portion of an annular body formed in an annular shape around an axis and protruding outward in a radial direction of the annular body and in a horizontal direction, and a second protrusion protruding outward in the radial direction from a position different from a position of the first protrusion in a circumferential direction of the annular body, and a first casing provided with a support surface supporting the first protrusion from below, and a first recess recessed outward in the radial direction and accommodating the second protrusion. A dimension of the first recess in an axial direction of the annular body is larger than a dimension of the second protrusion, and in a state where the axis of the annular body is disposed along the horizontal direction and the second protrusion is accommodated in the first recess, a gap is provided in the axial direction between the second protrusion and the first recess.

According to the present disclosure, there is provided a method for assembling a turbine assembly including a first main body provided with a first protrusion forming a portion of an annular body formed in an annular shape around an axis and protruding outward in a radial direction of the annular body and in a horizontal direction, and a second protrusion protruding outward in the radial direction from a position different from a position of the first protrusion in a circumferential direction of the annular body, and a first casing provided with a support surface supporting the first protrusion from below, and a circumferential groove provided along the circumferential direction, recessed outward in the radial direction, and accommodating the second protrusion. The method of assembling the turbine assembly includes a moving step of moving the first main body in a vertical direction so that the first protrusion is supported from below by the support surface and the second protrusion is accommodated in the circumferential groove, and a rotating step of rotating the first main body around the first protrusion by applying an axial force to the first main body at a position below the first protrusion in the vertical direction so that the second protrusion comes into contact with a wall surface of the circumferential groove.

Advantageous Effects of Invention

According to at least one embodiment of the present disclosure, a turbine assembly can be easily assembled and disassembled.

DESCRIPTION OF EMBODIMENTS

Figure 1:
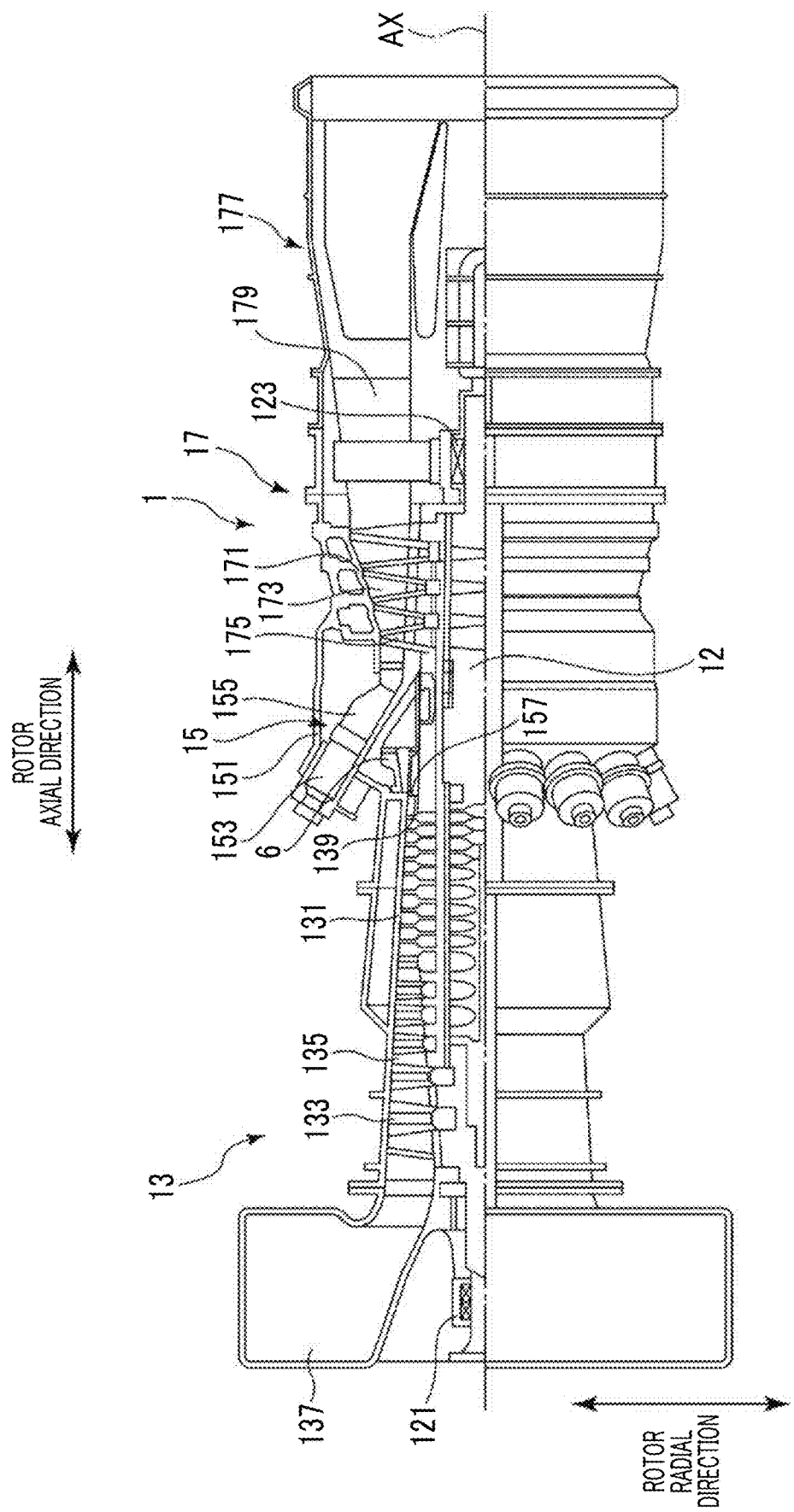
FIG. 1 is a view schematically illustrating an overall configuration of a gas turbine according to an embodiment.

Hereinafter, a rotary machine and a method for assembling a rotary machine according to an embodiment will be described with reference to the accompanying drawings.

However, dimensions, materials, shapes, and relative dispositions of the components described as embodiments or illustrated in the drawings are not intended to limit the scope of the present invention, and are merely explanatory examples.

In addition, although a gas turbine and a method for assembling a gas turbine will be described here as an example, the present invention is not limited thereto.

FIG. 1 is a view schematically illustrating an overall configuration of a gas turbine 1 according to an embodiment.

As illustrated in FIG. 1, the gas turbine 1 according to the embodiment includes a compressor 13, a plurality of combustors 15, and a turbine 17. The gas turbine 1 includes a rotor shaft 12 which is a rotary shaft disposed through the compressor 13 and the turbine 17, and the plurality of combustors 15 are disposed around the rotor shaft 12. The compressor 13, the plurality of combustors 15, and the turbine 17 are sequentially disposed along an axis AX of the rotor shaft 12 from an upstream side to a downstream side in an air flowing direction.

In the following description, an axial direction of the rotor shaft 12 is referred to as a rotor axial direction, a circumferential direction around the axis AX of the rotor shaft 12 is s referred to as a rotor circumferential direction, and a direction orthogonal to the axis of the rotor shaft 12 is referred to as a rotor radial direction.

The compressor 13 can generate compressed air by utilizing rotation of the rotor shaft 12. The compressor 13 has a compressor casing 131, a plurality of stages of compressor stator vanes 133, and a plurality of stages of compressor rotor blades 135. The compressor casing 131 is formed in a cylindrical shape, has the internally penetrating rotor shaft 12, and has a cylindrical space (casing) which internally accommodates the compressor stator vane 133 and the compressor rotor blade 135. In addition, the compressor casing 131 has an intake port 137 on the upstream side in the air flowing direction, and a discharge port 139 on the downstream side in the air flowing direction. The intake port 137 can draw air into the compressor casing 131 from the upstream side in the air flowing direction. The discharge port 139 is formed in an annular shape formed around the rotor shaft 12, and can discharge compressed air generated by the compressor 13.

The compressor stator vanes 133 are fixed to an inner periphery of the compressor casing 131 in a state of being aligned in the rotor axial direction and the rotor circumferential direction around the axis AX of the rotor shaft 12. The compressor rotor blades 135 are fixed to an outer periphery of the rotor shaft 12 to be located alternately with the compressor stator vanes 133 in the rotor axial direction in a state of being aligned in the rotor axial direction and the rotor circumferential direction around the axis AX of the rotor shaft 12.

Each of the plurality of combustors 15 can generate a combustion gas by using the compressed air generated by the compressor 13. A fuel can be supplied to the combustor 15 together with the compressed air, and the combustion gas is generated by combusting the fuel. The plurality of combustors 15 are disposed inside a combustor casing 151. The combustor casing 151 is formed in a cylindrical shape, has the internally penetrating rotor shaft 12, and has a cylindrical space (casing) which internally accommodates the plurality of combustors 15.

The plurality of combustors 15 are disposed in the rotor circumferential direction. For example, the plurality of combustors 15 include 16 combustors 15, and are disposed at an equal interval in the rotor circumferential direction.

Each of the plurality of combustors 15 has a combustion cylinder 153 and a transition piece 155. The fuel can be supplied to the combustion cylinder 153 together with the compressed air generated by the compressor 13, and the combustion gas is generated by combusting the fuel. The combustion cylinder 153 is formed in a cylindrical shape, and an axis of the combustion cylinder is disposed along the rotor axial direction. One end opening of the combustion cylinder 153 serves as an air supply port 157, and the air supply port 157 is disposed toward the discharge port 139 of the compressor 13. The transition piece 155 can lead the combustion gas generated in the combustion cylinder 153 from the combustion cylinder 153 to the turbine 17.

In the combustor 15 described above, when the high-temperature and high-pressure compressed air flows into the combustion cylinder 153 from the air supply port 157, the compressed air is mixed with the fuel injected from a main combustion burner to generate a swirling flow of a premixed gas.

The turbine 17 can generate rotational power of the rotor shaft 12 by utilizing the combustion gas. The turbine 17 has a turbine casing 171 and a plurality of stages of stator vane assemblies 173 and a plurality of stages of turbine rotor blades 175. The turbine casing 171 is formed in a cylindrical shape, has the internally penetrating rotor shaft 12, and has a cylindrical space (casing) which internally accommodates the stator vane assembly 173 and the turbine rotor blade 175. In addition, the turbine casing 171 has an exhaust hood 177 on the downstream side in the air flowing direction. The exhaust hood 177 has an exhaust diffuser 179, and can discharge an exhaust gas utilized for generating the rotational power of the rotor shaft 12. The plurality of stages of stator vane assemblies 173 are fixed to the inside of the turbine casing 171 in a state of being aligned in the rotor axial direction and the rotor circumferential direction around the axis AX of the rotor shaft 12. The plurality of stages of turbine rotor blades 175 are fixed to the outer periphery of the rotor shaft to be located alternately with the stator vane assemblies 173 in the rotor axial direction in a state of being aligned in the rotor axial direction and the rotor circumferential direction around the axis AX of the rotor shaft 12.

In the rotor shaft 12, an end portion on a compressor side is supported by a bearing portion 121, and an end portion on an exhaust hood side is supported by a bearing portion 123. In this manner, the rotor shaft 12 is rotatable around the axis of the rotor shaft 12. In addition, although not explicitly illustrated in the drawing, in the rotor shaft 12, the end portion on the compressor side is connected to a drive shaft of a generator.

In the gas turbine 1 described above, the air is drawn in from the intake port of the compressor 13, and the air is compressed by passing through the plurality of stages of compressor stator vanes 133 and the plurality of stages of compressor rotor blades 135. In this manner, the air passing through the compressor 13 becomes the high-temperature and high-pressure compressed air. Then, the high-temperature and high-pressure compressed air is supplied to the combustor 15 together with the fuel, and the fuel is combusted to generate the high-temperature and high-pressure combustion gas. The combustion gas passes through the plurality of stages of stator vane assemblies 173 and the plurality of stages of turbine rotor blades 175 of the turbine 17 to generate the rotational power for the rotor shaft 12, and the rotor shaft 12 is rotationally driven. Then, power is generated by applying the rotational power to the generator connected to the rotor shaft 12. Meanwhile, the exhaust gas after the rotor shaft 12 is rotationally driven is discharged as the exhaust gas to the atmosphere through the exhaust diffuser of the exhaust hood.

Figure 2:
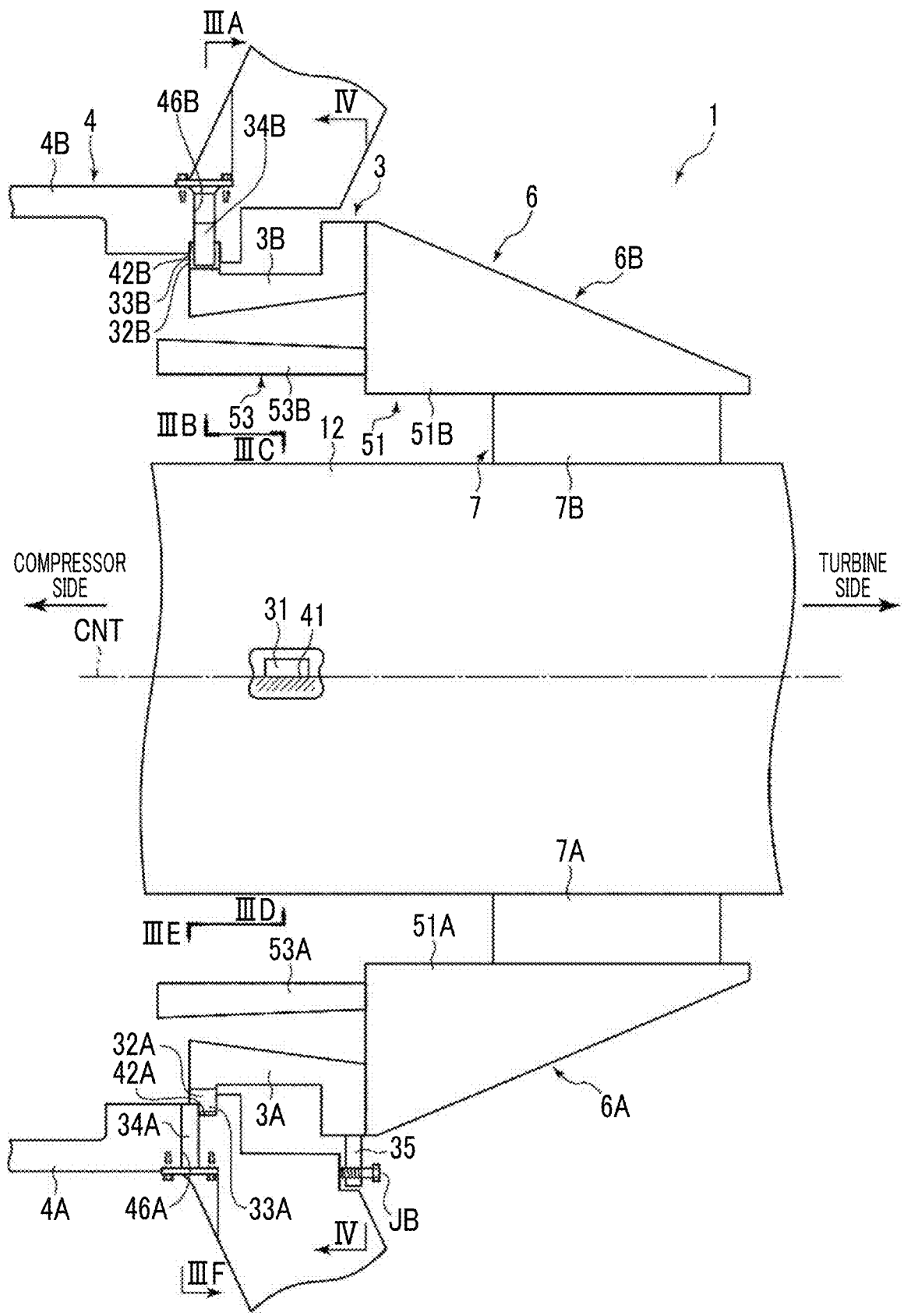
FIG. 2 is a sectional view schematically illustrating a main part configuration of the gas turbine according to the embodiment.
Figure 3:
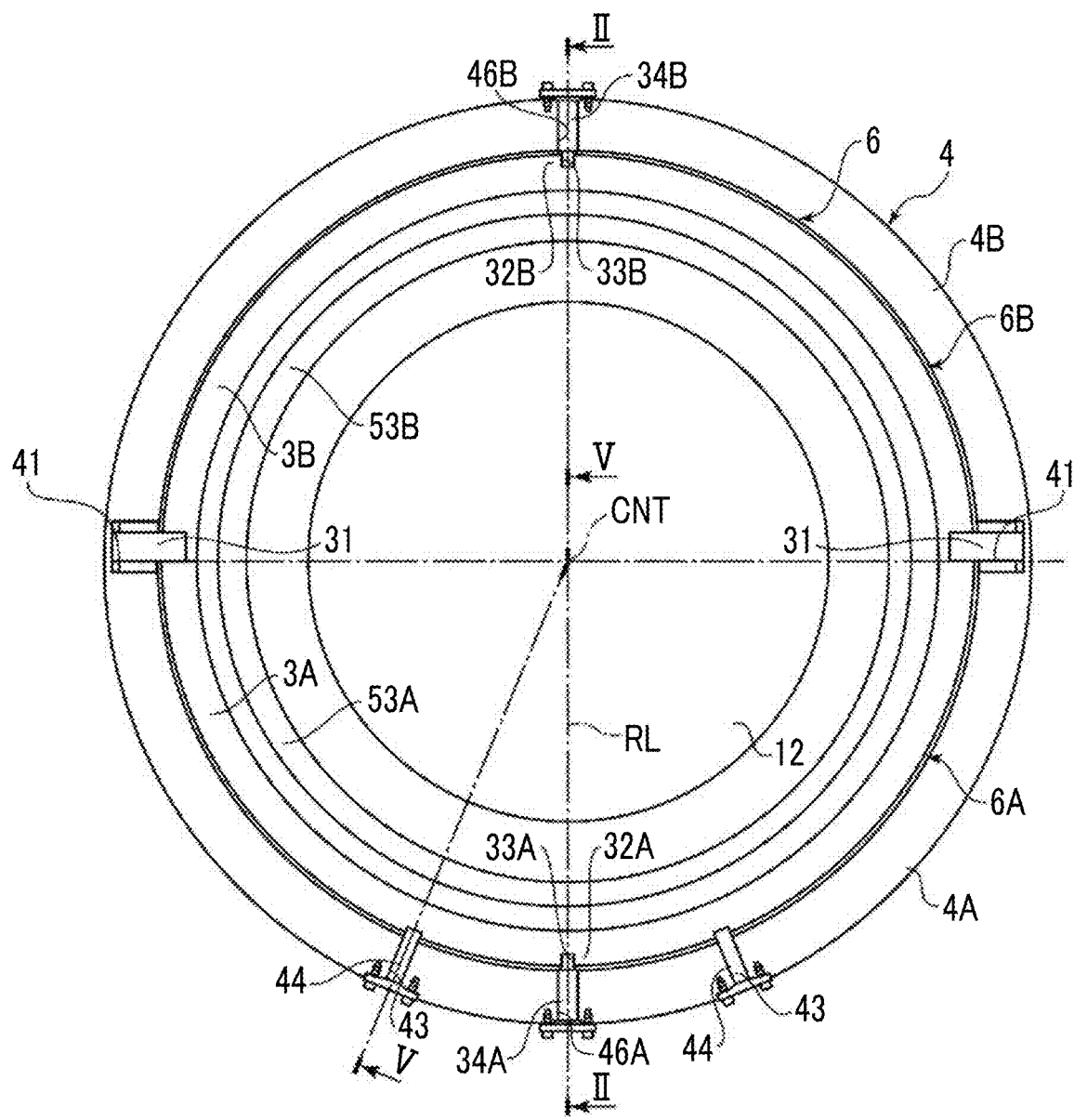
FIG. 3 is a sectional view taken along line IIIA-IIIB-IIIC-IIID-IIIE-IIIF of the gas turbine illustrated in FIG. 2.
Figure 4:
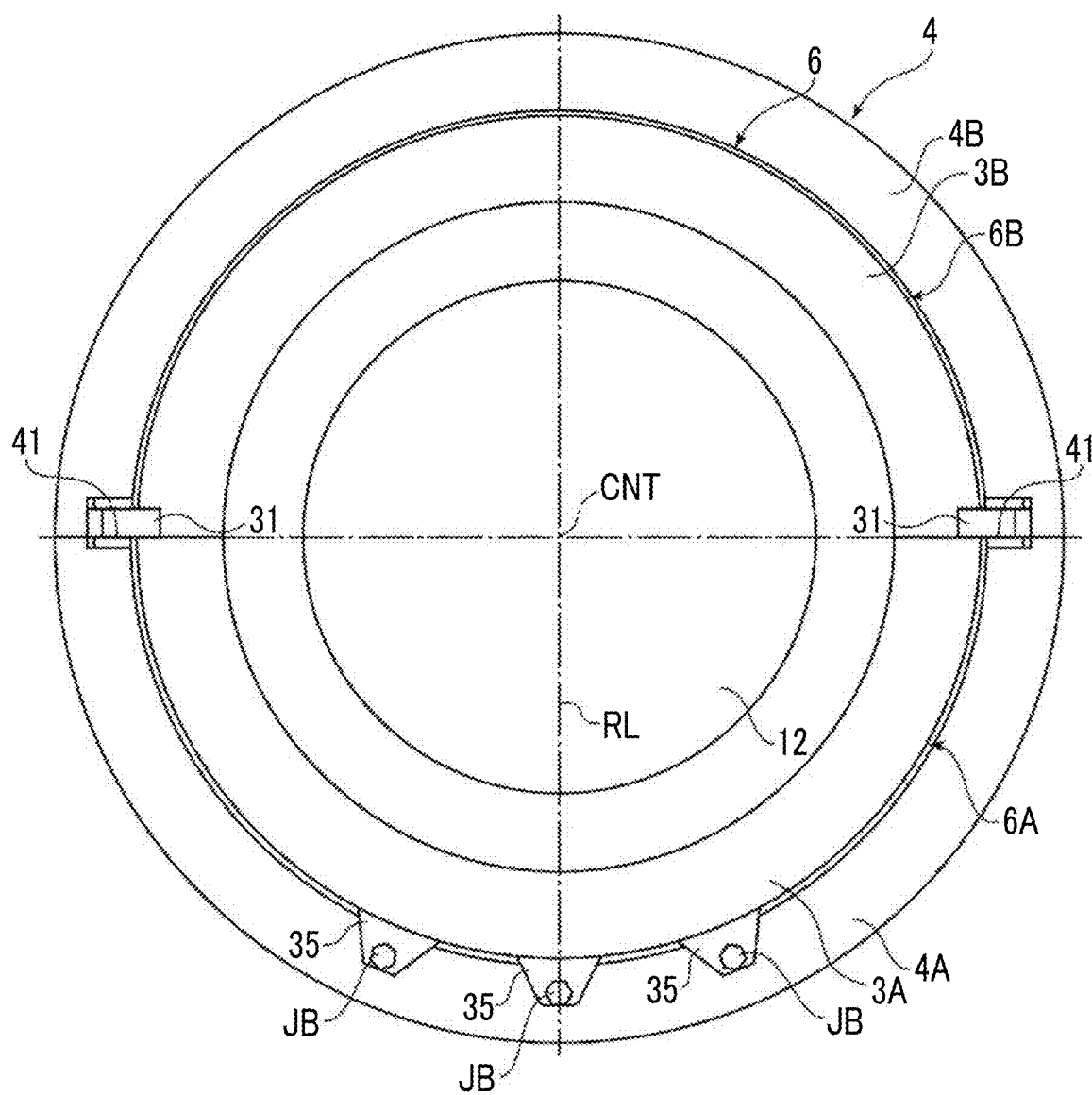
FIG. 4 is a sectional view taken along line IV-IV of the gas turbine illustrated in FIG. 2.
Figure 5:
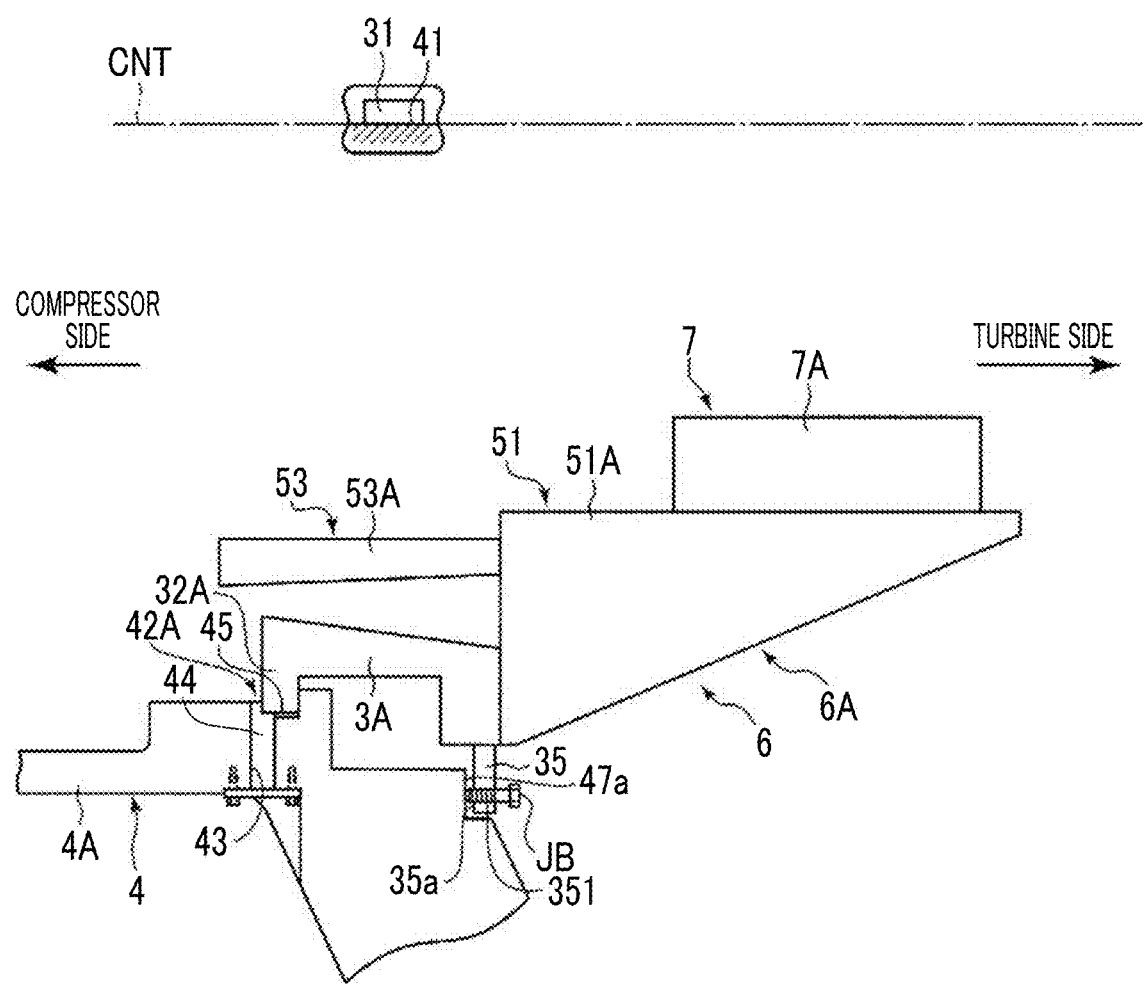
FIG. 5 is a sectional view taken along line V-V of the gas turbine illustrated in FIG. 3.
Figure 6:
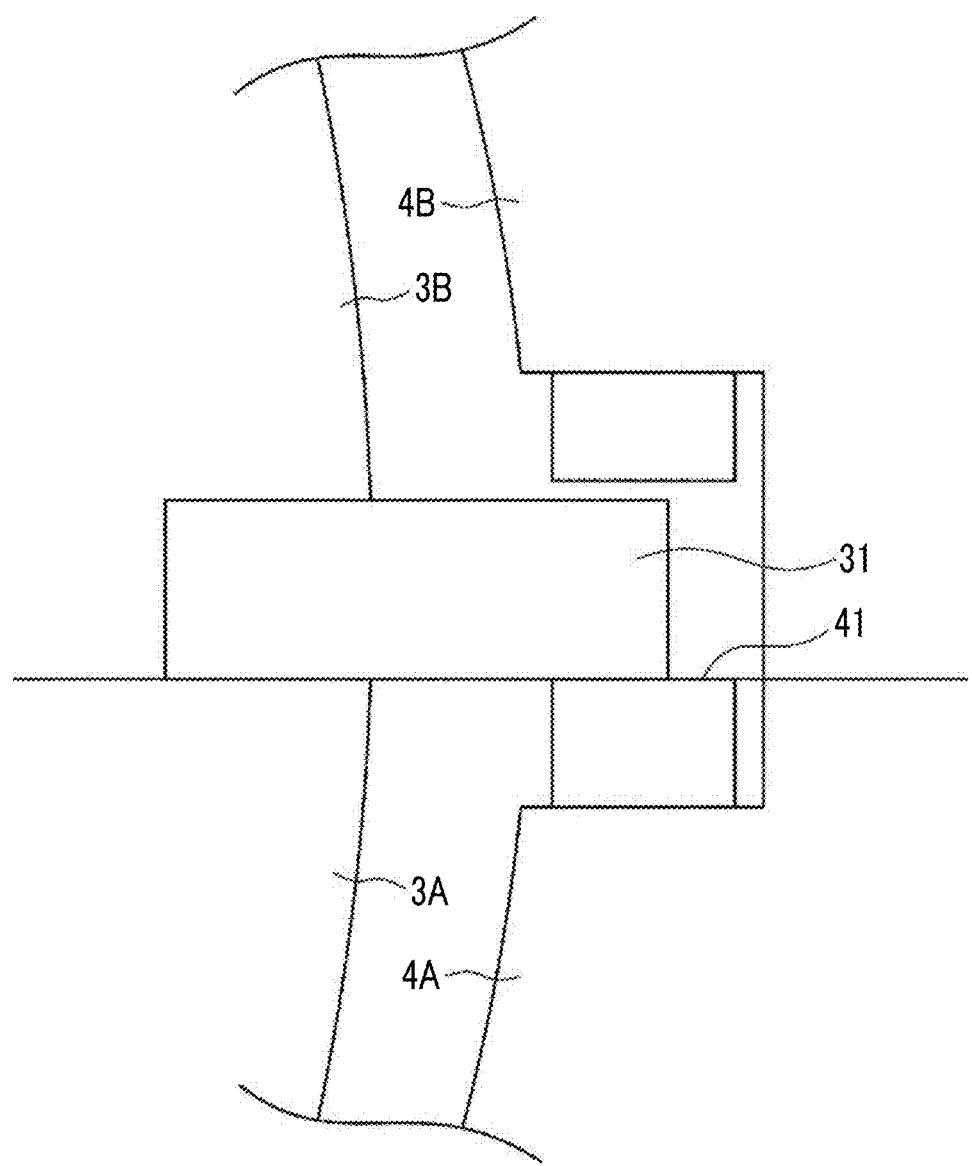
FIG. 6 is a schematic view schematically illustrating a horizontal key and a horizontal support surface.

FIG. 2 is a sectional view schematically illustrating a main part configuration of the gas turbine 1 illustrated in FIG. 1. FIG. 3 is a sectional view taken along line IIIA-IIIB-IIIC-IIID-IIIE-IIIF of the gas turbine 1 illustrated in FIG. 2, and FIG. 4 is a sectional view taken along line IV-IV of the gas turbine 1 illustrated in FIG. 2. FIG. 5 is a sectional view taken along line V-V of the gas turbine 1 illustrated in FIG. 3. FIG. 2 is a sectional view taken along line II-II illustrated in FIG. 3.

As illustrated in FIG. 2, the gas turbine 1 according to the embodiment includes a cooling air manifold assembly 6, a lower-half casing 4A, and an upper-half casing 4B.

The cooling air manifold assembly 6 is provided inside the combustor 15 in the radial direction of the rotor shaft 12 between the compressor 13 and the turbine 17. The cooling air manifold assembly 6 is an annular body formed in an annular shape around an axis CNT. The cooling air manifold assembly 6 has a structure which can be divided upward and downward (upper and lower divided structure) while a horizontal plane passing through the axis CNT is set as a boundary, and the cooling air manifold assembly 6 is formed by a lower-half part 6A and an upper-half part 6B.

The cooling air manifold assembly 6 includes a cooling air manifold 3, an intermediate shaft cover 51, and an inner diffuser 53.

The cooling air manifold 3 is an annular body provided on the outer periphery of the rotor shaft 12, and is provided in a cylindrical shape formed around the axis CNT. The cooling air manifold 3 has a structure which can be divided upward and downward (upper and lower divided structure) while the horizontal plane passing through the axis CNT is set as the boundary, and the cooling air manifold 3 is formed by a lower-half part 3A and an upper-half part 3B. A horizontal key 31 and a flange 32A are provided in the lower-half part 3A of the cooling air manifold 3. (Although the horizontal key 31 is not illustrated in FIG. 2, the horizontal key 31 is illustrated together with a horizontal support surface 41 by providing a window to facilitate understanding. Hereinafter, the same applies to FIG. 5). As illustrated in FIG. 3, the horizontal key 31 is a first protrusion protruding outward in the radial direction of the cooling air manifold 3 and in the horizontal direction, and a lower surface of the horizontal key 31 is provided outside of the lower-half part 3A in the radial direction to be located on the horizontal plane passing through the axis CNT.

As illustrated in FIG. 2, the flange 32A is a second protrusion protruding outward in the radial direction from a position different from a position of the horizontal key 31 in the circumferential direction of the cooling air manifold 3, and the flange 32A is provided to be located on the compressor side with respect to the horizontal key 31. A flange 32B is provided in the upper-half part 3B of the cooling air manifold 3. The flange 32B is provided at the same position as the flange 32A provided in the lower-half part 3A of the cooling air manifold 3 in the axial direction of the cooling air manifold 3.

The intermediate shaft cover 51 is attached to a turbine side of the cooling air manifold 3. As in the cooling air manifold 3, the intermediate shaft cover 51 is an annular body provided on the outer periphery of the rotor shaft 12, and is provided in an annular shape formed around the axis CNT. As in the cooling air manifold 3, the intermediate shaft cover 51 has a structure which can be divided upward and downward (upper and lower divided structure) while the horizontal plane passing through the axis CNT is set as the boundary, and the intermediate shaft cover 51 is formed by a lower-half part 51A and an upper-half part 51B. Therefore, the lower-half part 51A of the intermediate shaft cover 51 is assembled to the lower-half casing 4A in a state of being attached to the lower-half part 3A of the cooling air manifold 3, and the upper-half part 51B of the intermediate shaft cover 51 is attached to the lower-half part 51A of the intermediate shaft cover 51 attached to the lower-half part 3A of the cooling air manifold 3 in a state of being attached to the upper-half part 3B of the cooling air manifold 3.

The inner diffuser 53 is attached to the inside of the cooling air manifold 3 in the radial direction on the compressor side of the intermediate shaft cover 51. As in the cooling air manifold 3 and the intermediate shaft cover 51, the inner diffuser 53 is an annular body provided on the outer periphery of the rotor shaft 12, and is provided in a cylindrical shape formed around the axis CNT. As in the cooling air manifold 3 and the intermediate shaft cover 51, the inner diffuser 53 has a structure which can be divided upward and downward (upper and lower divided structure) while the horizontal plane passing through the axis CNT is set as the boundary, and the inner diffuser 53 is formed by a lower-half part 53A and an upper-half part 53B. Therefore, the lower-half part 53A of the inner diffuser 53 is assembled to the lower-half casing 4A in a state of being attached to the lower-half part 51A of the intermediate shaft cover 51, and the upper-half part 53B of the inner diffuser 53 is attached to the lower-half part 53A of the inner diffuser 53 attached to the lower-half part 51A of the intermediate shaft cover 51 in a state of being attached to the upper-half part 51B of the intermediate shaft cover 51.

Therefore, the lower-half part 6A of the cooling air manifold assembly 6 includes the lower-half part 3A of the cooling air manifold 3, the lower-half part 51A of the intermediate shaft cover 51, and the lower-half part 53A of the inner diffuser 53, and is handled in a state where the lower-half part 3A of the cooling air manifold 3 and the lower-half part 53A of the inner diffuser 53 are attached to the lower-half part 51A of the intermediate shaft cover 51. Similarly, the upper-half part 6B of the cooling air manifold assembly 6 includes the upper-half part 3B of the cooling air manifold 3, the upper-half part 51B of the intermediate shaft cover 51, and the upper-half part 53B of the inner diffuser 53, and is handled in a state where the upper-half part 3B of the cooling air manifold 3 and the upper-half part 53B of the inner diffuser 53 are attached to the upper-half part 51B of the intermediate shaft cover 51.

A seal ring holding ring 7 is attached to the inside of the intermediate shaft cover 51 described above in the radial direction. As in the cooling air manifold 3, the intermediate shaft cover 51, and the inner diffuser 53, the seal ring holding ring 7 is an annular body provided on the outer periphery of the rotor shaft 12, and is provided in a cylindrical shape formed around the axis CNT. As in the cooling air manifold 3, the intermediate shaft cover 51, and the inner diffuser 53, the seal ring holding ring 7 has a structure which can be divided upward and downward (upper and lower divided structure) while the horizontal plane passing through the axis CNT is set as the boundary, and the seal ring holding ring 7 is formed by the lower-half part 7A and the upper-half part 7B. Therefore, the lower-half part 7A of the seal ring holding ring 7 is attached to the lower-half part 6A of the cooling air manifold assembly 6 after the lower-half part 6A of the cooling air manifold assembly 6 is attached to the lower-half casing 4A.

As illustrated in FIG. 3, the lower-half casing 4A is a lower-half part of the casing 4 which accommodates the cooling air manifold assembly 6, and has a semi-cylindrical accommodation space. The lower-half casing 4A has the horizontal support surface 41 and a groove 45 (refer to FIG. 5). The horizontal support surface 41 is a support surface supporting the horizontal key 31 from below. In an example illustrated in FIG. 3, the horizontal support surface 41 is provided on the horizontal plane passing through the axis CNT. However, as long as the horizontal support surface 41 horizontally supports the horizontal the key 31, configuration is not limited to the example in which the horizontal support surface 41 is provided on the horizontal plane passing through the axis CNT. As illustrated in FIG. 5, the groove 45 is a first recess recessed outward in the radial direction of the cooling air manifold assembly 6 and accommodating the flange 32A.

Figure 7:
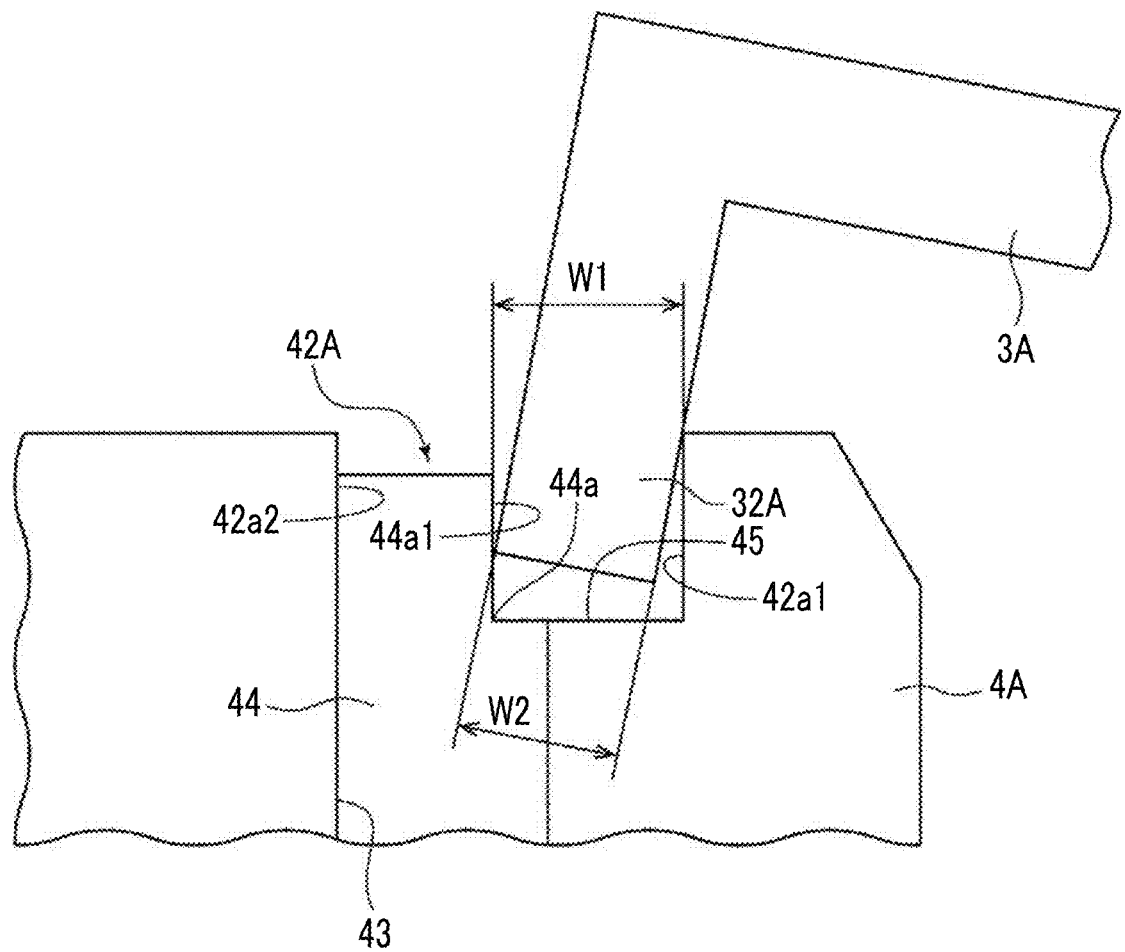
FIG. 7 is a schematic view schematically illustrating a flange and a groove, and is a view illustrating a state where a lower-half part of a cooling air manifold assembly is tilted by a moment.
Figure 8:
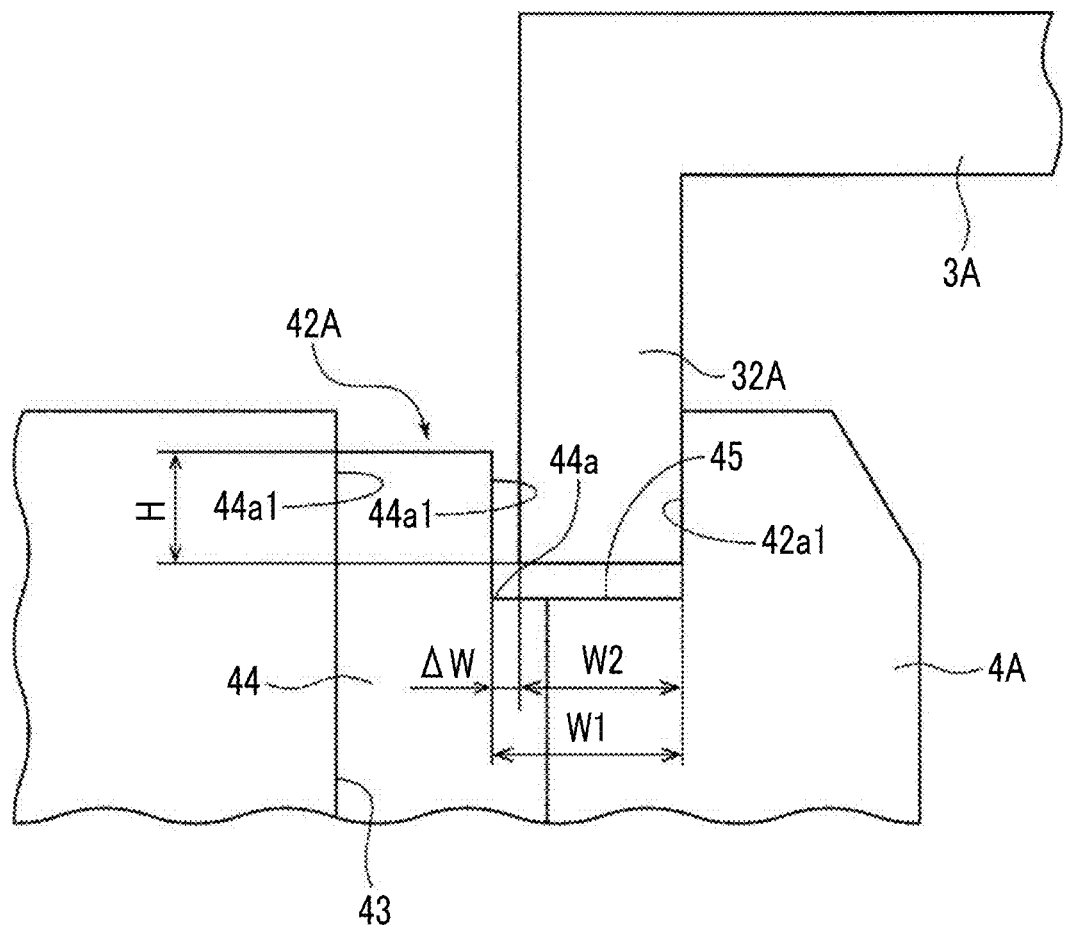
FIG. 8 is a schematic view schematically illustrating the flange and the groove, and is a view illustrating a state where an axis of the cooling air manifold assembly is disposed along a horizontal direction.

As illustrated in FIG. 7, a dimension W1 of the groove 45 in the axial direction of the cooling air manifold assembly 6 is larger than a dimension W2 of the flange 32A. As illustrated in FIG. 8, the axis CNT of the cooling air manifold assembly 6 is disposed along the horizontal direction. A gap is provided in the axial direction of the cooling air manifold assembly 6 between the flange 32A and the groove 45 in a state where the flange 32A is accommodated in the groove 45.

As illustrated in FIG. 2, the upper-half casing 4B is an upper-half part of the casing 4 accommodating the cooling air manifold assembly 6, and forms the casing 4 together with the lower-half casing 4A. A circumferential groove 42B is provided in the upper-half f casing 4B. The circumferential groove 42B is a groove which accommodates the flange 32B, and is provided along the circumferential direction of the cooling air manifold assembly 6 at the same position as a circumferential groove 42A provided in the lower-half casing 4A in the axial direction of the cooling air manifold assembly 6.

According to the gas turbine 1 in the embodiment described above, the horizontal support surface 41 supports the horizontal key 31 from below so that the lower-half casing 4A supports the cooling air manifold assembly 6.

In addition, the flange 32A is accommodated in the groove 45. Therefore, the lower-half part 6A of the cooling air manifold assembly 6 can be prevented from being tilted (posture change) due to a moment, and a posture of the lower-half part 6A of the cooling air manifold assembly 6 can maintained while the gas turbine 1 is assembled and disassembled. Therefore, it is not necessary to form a joining structure between the lower-half part 6A and the lower-half casing 4A of the cooling air manifold assembly 6, and the gas turbine 1 can be easily assembled and disassembled.

As illustrated in FIG. 8, in the gas turbine 1 according to the embodiment, in a state where the axis CNT of the cooling air manifold assembly 6 is disposed along the horizontal direction and the flange 32A is accommodated in the groove 45, a dimension H in the vertical direction of the portion accommodated in the groove 45 of the flange 32A is larger than a dimension ΔW of the gap.

According to this configuration, a state where the flange 32A is accommodated in the groove 45 is secured. Therefore, the lower-half part 6A of the cooling air manifold assembly 6 can be prevented from being tilted (posture change) due to a moment, and a posture of the lower-half part 6A of the cooling air manifold assembly 6 can be maintained while the gas turbine 1 is assembled and disassembled. Therefore, the gas turbine 1 can be easily assembled and disassembled.

As illustrated in FIG. 5, in the gas turbine 1 according to the embodiment, the circumferential groove 42A and a side pin hole 43 are provided in the lower-half casing 4A. The circumferential groove 42A is provided along the circumferential direction of the cooling air manifold assembly 6, and penetrates the lower-half casing 4A which accommodates the flange 32A in the radial direction of the cooling air manifold assembly 6. The side pin hole 43 communicates with the circumferential groove 42A inside the cooling air manifold assembly 6 of the side pin hole 43 in the radial direction. A side pin 44 is inserted into the side pin hole 43 from the outside of the cooling air manifold assembly 6 in the radial direction. In this manner, a dimension of the cooling air manifold assembly 6 of the groove 45 in the axial direction is defined by a surface 44a1 (refer to FIG. 7) facing the flange 32A of the side pin 44 inserted into the side pin hole 43.

According to this configuration, a dimension of the groove 45 in the axial direction is defined by the surface 44a1 facing the flange 32A in the side pin 44 inserted into the side pin hole 43. Therefore, the dimension of the groove 45 in the axial direction can be defined by inserting the side pin 44 into the side pin hole 43. In addition, the side pin 44 can be inserted into the side pin hole 43 after the flange 32A is accommodated in the circumferential groove 42A. Therefore, the dimension of the cooling air manifold assembly 6 of the groove 45 in the axial direction can be easily adjusted (cutting adjustment can be performed on the side pin 44). Furthermore, after the flange 32A is accommodated in the circumferential groove 42A, the dimension of the cooling air manifold assembly 6 of the groove 45 in the axial direction can be more finely set.

As illustrated in FIG. 7, in the gas turbine 1 according to the embodiment, the surface 44a1 facing the flange 32A in the side pin 44 is provided in a cutout 44a formed in a tip portion of the side pin 44.

According to this configuration, the surface 44a1 facing the flange 32A in the side pin 44 is provided in the cutout 44a formed in the tip portion of the side pin 44. Therefore, the dimension of the groove 45 in the axial direction is defined by the cutout 44a formed in the tip portion of the side pin 44. In other words, since the side pin 44 is inserted into the side pin hole 43, the dimension of the groove 45 in the axial direction can be defined by one wall surface 42a1 of the circumferential groove 42A and the surface 44a1 provided in the cutout 44a of the side pin 44. In addition, the side pin 44 can be inserted into the side pin hole 43 after the flange 32A is accommodated in the circumferential groove 42A. Therefore, it is possible to easily adjust the dimension of the groove 45 in the axial direction which is defined by the one wall surface 42al of the circumferential groove 42A and the surface 44*a*1 provided in the cutout 44*a* of the side pin 44 (cutting adjustment can be performed on the surface 44*a*1 provided in the cutout 44*a* of the side pin 44). Furthermore, it is possible to more finely set the dimension W1 of the groove 45 in the axial direction which is defined by the one wall surface 42*a*1 of the circumferential groove 42A and the surface 44*a*1 provided in the cutout 44*a* of the side pin 44 after the flange 32A is accommodated in the circumferential groove 42A.

Figure 9:
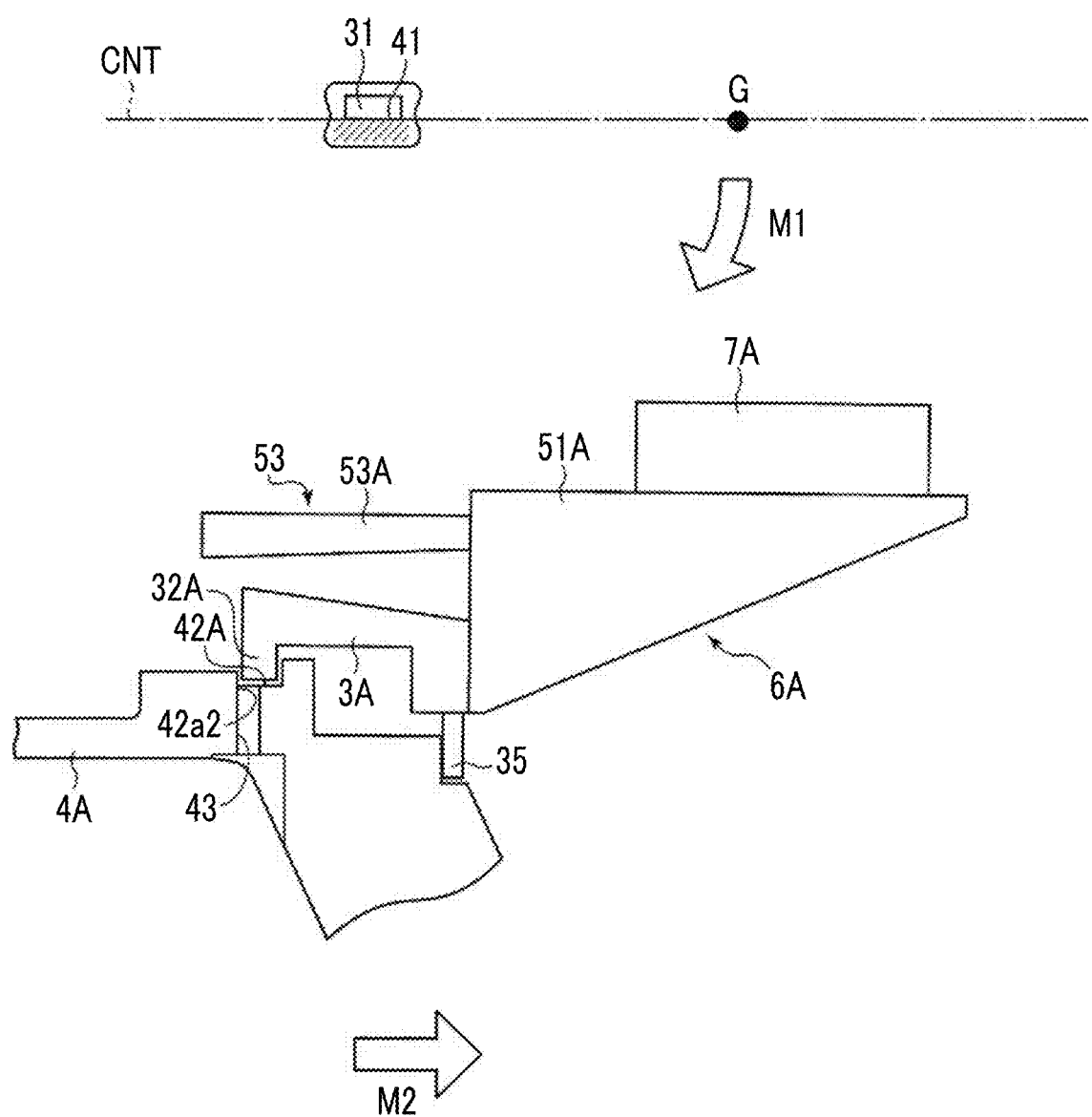
FIG. 9 is a schematic view schematically illustrating a relationship among the horizontal key, the flange, and the groove.

As illustrated in FIG. 9, in the gas turbine 1 according to the embodiment, a position of the horizontal key 31 in the axial direction of the cooling air manifold assembly 6 is different from a position of a center of gravity G of the lower-half part 6A of the cooling air manifold assembly 6 in the axial direction of the cooling air manifold assembly 6.

According to this configuration, when the gas turbine 1 is assembled and disassembled, the flange 32A interferes with the wall surface 42*a*2 of the circumferential groove 42A. Therefore, the lower-half part 6A of the cooling air manifold assembly 6 can be prevented from being tilted (posture change) due to a moment, and the posture of the lower-half part 6A of the cooling air manifold assembly 6 can be maintained when the gas turbine 1 is assembled and disassembled. Therefore, the gas turbine 1 can be easily assembled and disassembled.

As illustrated in FIG. 8, in the gas turbine 1 according to the embodiment, in a state where the axis CNT of the cooling air manifold assembly 6 is disposed along the horizontal direction and the flange 32A is accommodated in the groove 45, a gap in the vertical direction is provided between a bottom surface of the flange 32A and a bottom surface of the groove 45.

According to this configuration, the gap in the vertical direction is provided between the bottom surface of the flange 32A and the bottom surface of the groove 45. Therefore, the bottom surface of the flange 32A can be prevented from coming into contact with (interfering with) the bottom surface of the groove 45. In this manner, the posture of the lower-half part 6A of the cooling air manifold assembly 6 with respect to the lower-half casing 4A can be adjusted.

As illustrated in FIG. 9, in the gas turbine 1 according to the embodiment, the second protrusion (flange 32A) is provided below the horizontal key 31 in the vertical direction.

In the gas turbine 1, in order to effectively generate a moment M2 that cancels a moment M1 generated when the center of gravity of the lower-half part 6A of the cooling air manifold assembly 6 deviates from the horizontal key 31, as illustrated in FIG. 9, it is desirable that the second protrusion (flange 32A) is provided at a position where a length of an arm from the horizontal key 31 serving as a fulcrum is sufficiently secured.

According to the gas turbine 1, the second protrusion (flange 32A) is provided below the horizontal key 31 in the vertical direction. In this manner, the second protrusion (flange 32A) can be provided at the position where the length of the arm from the horizontal key 31 serving as the fulcrum is sufficiently secured. Therefore, when the center of gravity of the lower-half part 6A of the cooling air manifold assembly 6 deviates from the horizontal key 31, the moment M2 that cancels the moment M1 generated in the cooling air manifold assembly 6 can be effectively generated in the cooling air manifold assembly 6, since the second protrusion (flange 32A) is present.

As illustrated in FIG. 3, in the gas turbine 1 according to the embodiment, a torque pin hole 46A is provided in the lower-half casing 4A. The torque pin hole 46A is a second hole penetrating the lower-half casing 4A in the radial direction of the cooling air manifold assembly 6. For example, the torque pin hole 46A is provided directly below the axis CNT. In addition, in the gas turbine 1 according to the embodiment, a torque pin groove 33A is provided in the lower-half part 6A of the cooling air manifold assembly 6. The torque pin groove 33A is a second recess recessed inward in the radial direction of the cooling air manifold assembly 6. For example, the torque pin groove 33A is provided in the flange 32A provided in the lower-half part 3A of the cooling air manifold 3. For example, the torque pin groove 33A is provided directly below the axis CNT to cross the flange 32A in the axial direction of the cooling air manifold assembly 6. In addition, the gas turbine 1 according to the embodiment includes a torque pin 34A. The torque pin 34A is inserted into the torque pin hole 46A and the torque pin groove 33A from the outside of the cooling air manifold assembly 6 in the radial direction.

According to this configuration, the torque pin 34A is inserted into the torque pin hole 46A and the torque pin groove 33A from the outside of the cooling air manifold assembly 6 in the radial direction. In this manner, the lower-half part 6A of the cooling air manifold assembly 6 is constrained with respect to the lower-half casing 4A in the circumferential direction of the cooling air manifold assembly 6. That is, the lower-half part 6A of the cooling air manifold assembly 6 can be fixed to the lower-half casing 4A in the circumferential direction of the cooling air manifold assembly 6.

In the gas turbine 1 according to the embodiment, the torque pin hole 46A communicates with the circumferential groove 42A.

According to this configuration, when the torque pin 34A is inserted into the torque pin hole 46A, the torque pin 34A passes through the circumferential groove 42A, and is inserted into the torque pin groove 33A provided in the lower-half part 6A of the cooling air manifold assembly 6.

In the gas turbine 1 according to the embodiment, a torque pin hole 46B is provided in the upper-half casing 4B. The torque pin hole 46B is a third hole penetrating the upper-half casing 4B in the radial direction of the cooling air manifold assembly 6. For example, the torque pin hole 46B is provided directly above the axis CNT. In addition, in the gas turbine according to the embodiment, a torque pin groove 33B is provided in the upper-half part 6B of the cooling air manifold assembly 6. The torque pin groove 33B is a second recess recessed inward in the radial direction of the cooling air manifold assembly 6. For example, the torque pin groove 33B is provided in the flange 32B provided in the upper-half part 3B of the cooling air manifold 3. For example, the torque pin groove 33B is provided directly above the axis CNT to cross the flange 32B in the axial direction of the cooling air manifold assembly 6. In addition, the gas turbine 1 according to the embodiment includes a torque pin 34B. The torque pin 34B is inserted into the torque pin hole 46B and the torque pin groove 33B from the outside of the cooling air manifold assembly 6 in the radial direction.

According to this configuration, the torque pin 34B is inserted into the torque pin hole 46B and the torque pin groove 33B from the outside of the cooling air manifold assembly 6 in the radial direction. In this manner, the upper-half part 6B of the cooling air manifold assembly 6 is constrained with respect to the upper-half casing 4B in the circumferential direction of the cooling air manifold assembly 6. That is, the upper-half part 6B of the cooling air manifold assembly 6 can be fixed to the upper-half casing 4B in the circumferential direction of the cooling air manifold assembly 6.

In the gas turbine 1 according to the embodiment, the torque pin hole 46B communicates with the circumferential groove 42B.

According to this configuration, when the torque pin 34B is inserted into the torque pin hole 46B, the torque pin 34B passes through the circumferential groove 42B, and is inserted into the torque pin groove 33B provided in the lower-half part 6A of the cooling air manifold assembly 6.

In the gas turbine 1 according to the embodiment, the side pin holes 43 are provided on both sides of a reference line RL intersecting with the axis CNT and extending in the vertical direction. For example, the side pin holes 43 are provided one by one on each of both sides of the reference line RL, in a lower region of the lower-half casing 4A.

According to this configuration, the lower-half part 6A of the cooling air manifold assembly 6 is supported on both sides of the reference line RL intersecting with the axis CNT and extending in the vertical direction. Therefore, the lower-half part 6A of the cooling air manifold assembly 6 can be supported in a well-balanced manner.

As illustrated in FIG. 5, in the gas turbine 1 according to the embodiment, the horizontal key 31 and the flange 32A are provided at positions separated in the axial direction.

In the gas turbine 1, in order to allow thermal elongation, a dimensional difference (axial dimensional difference ΔW) between the groove 45 and the flange 32A in the axial direction of the cooling air manifold assembly 6 is required to some extent. However, as illustrated in FIG. 10, when the dimensional difference (axial dimensional difference ΔW) between the groove 45 and the flange 32A is increased, tilting (40) caused by the moment of the cooling air manifold assembly 6 is also increased.

On the other hand, even when the dimensional difference (axial dimensional difference ΔW) between the groove 45 and the flange 32A is the same, when a distance R from the horizontal key 31 to the flange 32A (groove 45) is increased, tilting (40) caused by the moment of the cooling air manifold assembly 6 is decreased. In other words, even when tilting (40) caused by the moment of the cooling air manifold assembly is constant, when the distance R from the horizontal key 31 to the flange 32A (groove 45) is increased, the dimensional difference (axial dimensional difference ΔW) between the groove 45 and the flange 32A can be increased.

Figure 10:
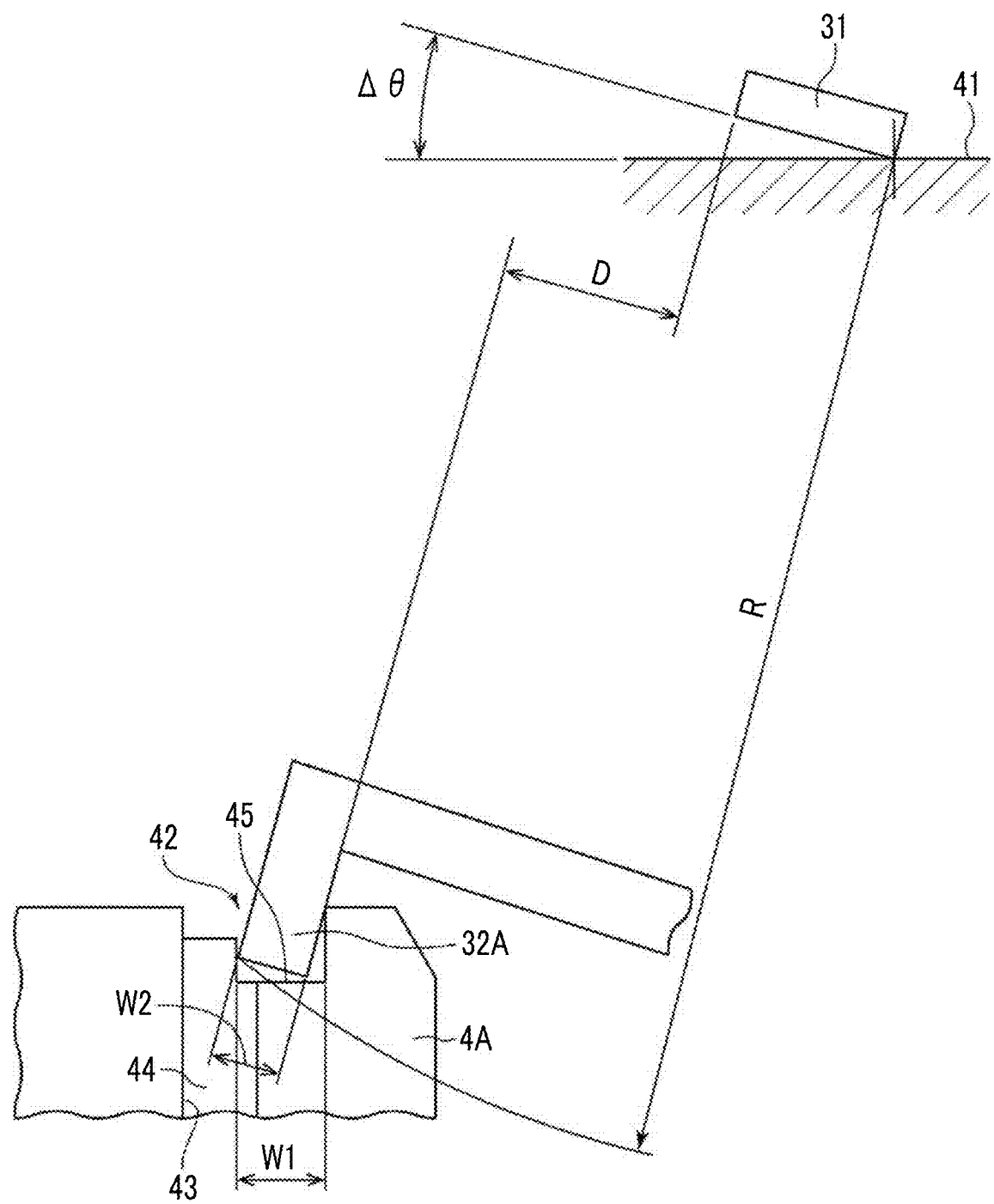
FIG. 10 is a schematic view for describing a moment generated when a center of gravity of the cooling air manifold assembly deviates to a downstream side from the horizontal key and a moment for canceling the moment.

According to the gas turbine 1, the horizontal key 31 and the flange 32A (groove 45) are provided at positions separated in the axial direction of the cooling air manifold assembly 6 (for example, positions separated by a distance D in FIG. 10). In this manner, the distance R between the horizontal key 31 and the flange 32A (groove 45) can be increased. Therefore, while a sufficient amount of the dimensional difference between the groove 45 and the flange 32A is secured in the axial direction of the cooling air manifold assembly 6, tilting (40) caused by the moment of the cooling air manifold assembly 6 can be kept to or below an upper limit.

Figure 11:
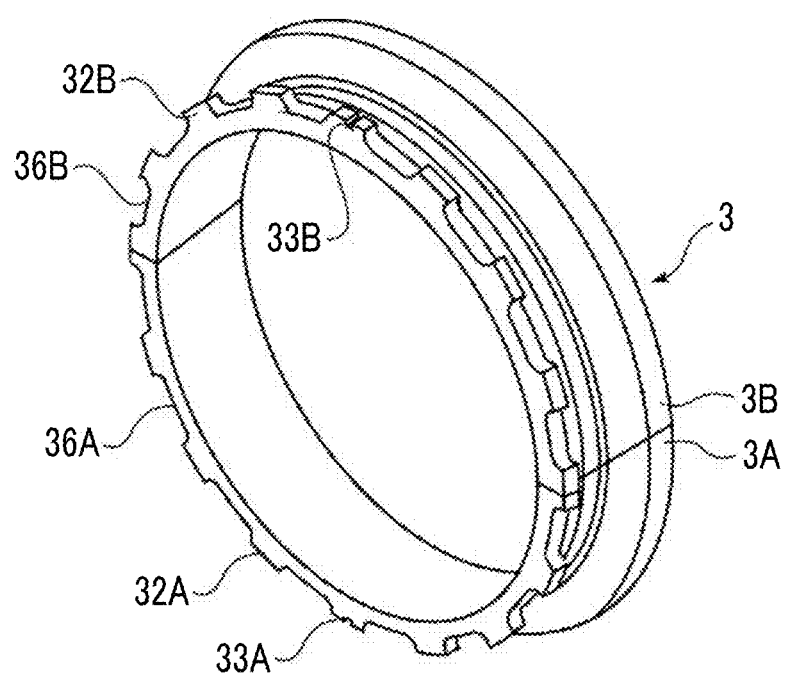
FIG. 11 is a perspective view illustrating a slit provided in the flange.

As illustrated in FIG. 11, in the gas turbine 1 according to the embodiment, the flanges 32A and 32B are provided with a plurality of slits 36A and 36B in the circumferential direction of the cooling air manifold assembly 6 at positions different from positions of the torque pin grooves 33A and 33B. For example, the plurality of slits are provided over an entire periphery of the cooling air manifold assembly 6 in the circumferential direction of the cooling air manifold assembly 6, and are recessed inward in the radial direction from the outside in the radial direction.

According to this configuration, the flanges 32A and 32B are provided with the plurality of slits 36A and 36B in the circumferential direction at the positions different from the positions of the torque pin grooves 33A and 33B. Therefore, oval deformation of the cooling air manifold 3 can reduced.

As illustrated in FIG. 4, in the gas turbine 1 according to the embodiment, a jack bolt flange 35 is provided in the lower-half part 6A of the cooling air manifold assembly 6. The jack bolt flange 35 is a third protrusion protruding outward in the radial direction of the cooling air manifold assembly 6 from the lower-half part 6A of the cooling air manifold assembly 6 at a position in the axial direction of the cooling air manifold assembly 6 which is different from a position of the flange 32A. As illustrated in FIG. 5, for example, the jack bolt flange 35 is provided on the turbine side with respect to the flange 32A at a position below the horizontal key 31 in a gravity direction. A first surface 35a is provided in the jack bolt flange 35. The first surface 35a faces the flange 32A side in the axial direction of the cooling air manifold assembly 6, which is a side where the flange 32A is present when viewed from the jack bolt flange 35 in the axial direction of the cooling air manifold assembly 6. The jack bolt flange 35 is provided with a bolt hole 351 parallel to the axial direction of the cooling air manifold assembly 6. A jack bolt JB can be fitted into the bolt hole 351. Meanwhile, the lower-half casing 4A is provided with a second surface 47a. The second surface 47a faces a side opposite to the flange 32A side in the axial direction of the cooling air manifold assembly 6 in the axial direction of the cooling air manifold assembly 6, and faces the first surface 35a.

According to this configuration, a posture of the lower-half part 6A of the cooling air manifold assembly 6 can be adjusted by adjusting a distance of the cooling air manifold assembly 6 in the axial direction between the first surface 35a provided in the jack bolt flange 35 and the second surface 47a provided in the lower-half casing 4A.

In the gas turbine 1 according to the embodiment, an expanding/contracting member (not illustrated) is provided between the first surface 35a and the second surface 47a. For example, the expanding/contracting member is a hydraulic jack, and can change the distance of the cooling air manifold assembly 6 in the axial direction between the first surface 35a and the second surface 47a.

According to this configuration, the posture of the lower-half part 6A of the cooling air manifold assembly 6 can be adjusted in such a manner that the expanding/contracting member adjusts the distance of the cooling air manifold assembly 6 in the axial direction between the first surface 35a provided in the jack bolt flange 35 and the second surface 47a provided in the lower-half casing 4A.

FIGS. 12A to 12F are schematic views schematically illustrating a method for assembling the gas turbine 1 according to an embodiment.

Figure 12A:
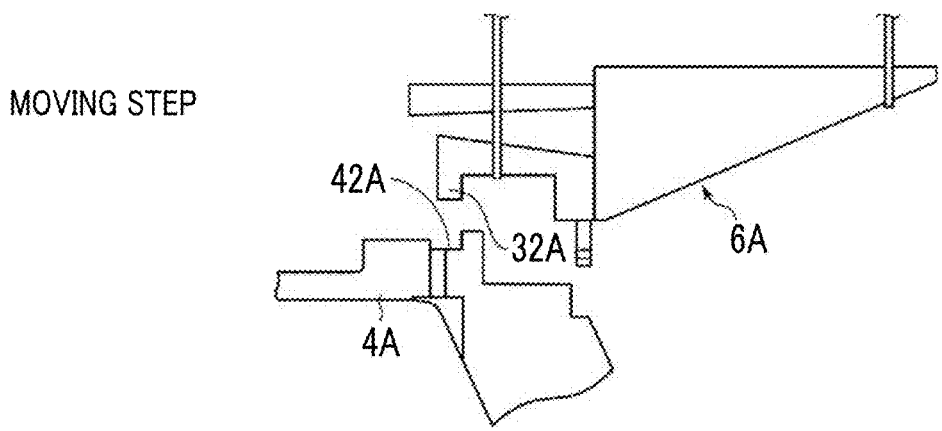
FIG. 12A is a schematic view schematically illustrating a method for assembling a gas turbine according to an embodiment, and is a view illustrating a moving step.
Figure 12B:
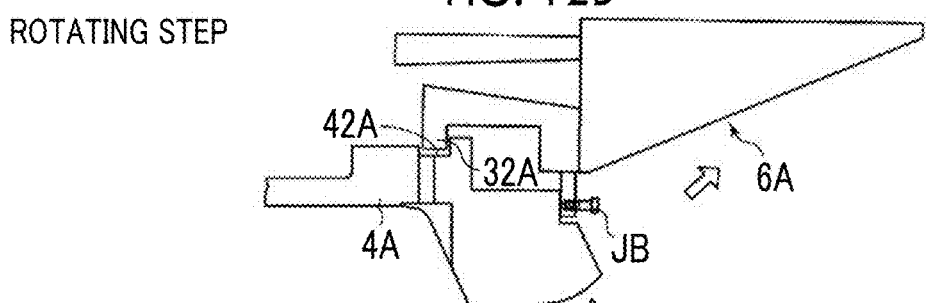
FIG. 12B is a schematic view schematically illustrating the method for assembling the gas turbine according to the embodiment, and is a view illustrating a rotating step.

As illustrated in FIGS. 12A and 12B, the method for assembling the gas turbine 1 according to the embodiment includes a moving step and a rotating step.

As illustrated in FIG. 12A, the moving step is a step in which the lower-half part 6A of the cooling air manifold assembly 6 is moved in the vertical direction so that the horizontal key 31 is supported from below by the horizontal support surface 41 and the flange 32A is accommodated in the circumferential groove 42A. In the moving step, the lower-half part 6A of the cooling air manifold assembly 6 is accommodated in the lower-half casing 4A, and the lower-half part 6A of the cooling air manifold assembly 6 is supported by the lower-half casing 4A. When the center of gravity of the lower-half part 6A of the cooling air manifold assembly 6 deviates from the horizontal key 31, the lower-half part 6A of the cooling air manifold assembly 6 is inclined around the horizontal key 31 as a fulcrum, and is supported by the lower-half casing 4A.

As illustrated in FIG. 12B, the rotating step is a step in which the lower-half part 6A of the cooling air manifold assembly 6 is rotated around the horizontal key 31 by applying a force (axial force) to the lower-half part 6A of the cooling air manifold assembly 6 in a direction of the axis CNT at a position below the horizontal key 31 in the vertical direction so that the flange 32A comes into contact with the wall surface of the circumferential groove 42A. In the rotating step, the jack bolt JB is fitted into the bolt hole 351 provided in the jack bolt flange 35, and the jack bolt JB fitted into the bolt hole 351 is rotated to obtain a reaction force from the lower-half casing 4A. In this manner, tilting (posture) of the lower-half part of the cooling air manifold assembly 6 is corrected.

According to the method for assembling the gas turbine 1 in the embodiment described above, the lower-half part 6A of the cooling air manifold assembly 6 is moved in the vertical direction so that the horizontal key 31 is supported from below by the horizontal support surface 41 and the flange 32A is accommodated in the circumferential groove 42A. In this manner, the lower-half casing 4A supports the lower-half part 6A of the cooling air manifold assembly 6 from below.

In addition, the lower-half part 6A of the cooling air manifold assembly 6 is rotated so that the flange 32A comes into contact with the wall surface of the circumferential groove 42A while the gas turbine 1 is assembled. In this manner, the posture of the lower-half part 6A of the cooling air manifold assembly 6 is properly maintained. Therefore, the gas turbine 1 can be easily assembled.

Figure 12C:
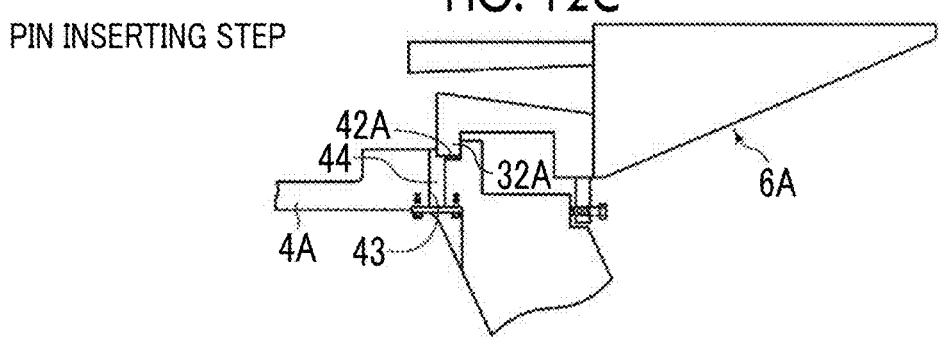
FIG. 12C is a schematic view schematically illustrating the method for assembling the gas turbine according to the embodiment, and is a view illustrating a pin inserting step.
Figure 12D:
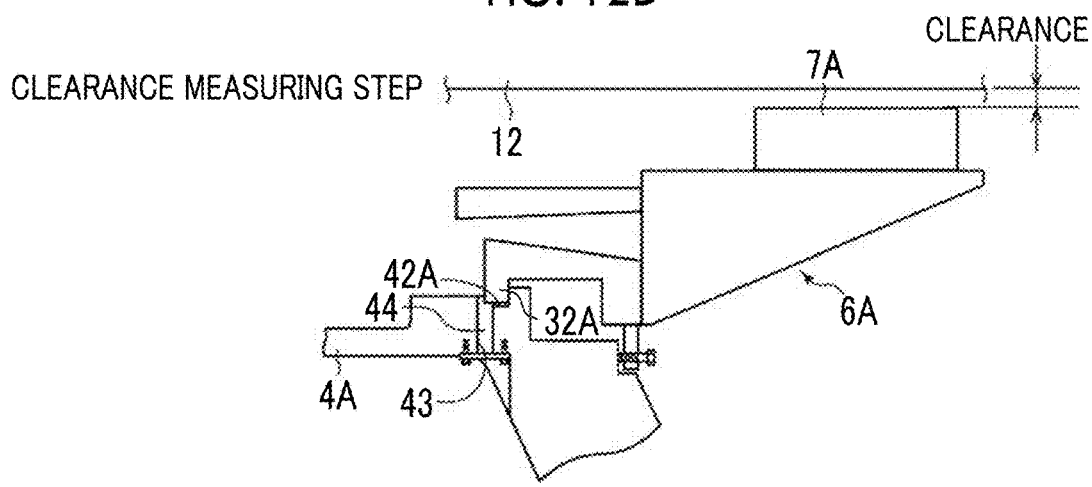
FIG. 12D is a schematic view schematically illustrating the method for assembling the gas turbine according to the embodiment, and is a view illustrating a clearance measuring step.

As illustrated in FIGS. 12C and 12D, the method for assembling the gas turbine 1 according to the embodiment further includes a pin inserting step and a clearance measuring step.

As illustrated in FIG. 12C, the pin inserting step is a step of inserting the side pin 44 into the side pin hole 43 and inserting the torque pin 34A into the torque pin hole 46A. In the pin inserting step, the groove 45 is defined in the axial direction of the rotor shaft 12. Therefore, the dimension of the groove 45 is determined in the axial direction of the rotor shaft 12, and the posture of the lower-half part 6A of the cooling air manifold assembly 6 is determined. In addition, in the pin inserting step, the circumferential direction of the lower-half part 6A of the cooling air manifold assembly 6 is constrained with respect to the lower-half casing 4A.

As illustrated in FIG. 12D, the clearance measuring step is a step in which the seal ring holding ring 7 and the rotor shaft 12 are installed with respect to the lower-half part 6A of the cooling air manifold assembly 6, and before the rotor shaft 12 is installed and after the rotor shaft 12 is installed, a clearance between the rotor shaft 12 and the seal ring holding ring 7 is measured. When the clearance is not proper, cutting adjustment is performed on the horizontal key 31 and the side pin 44. In the clearance measuring step, the clearance between the rotor shaft 12 and the seal ring holding ring 7 is properly adjusted, and the rotor shaft 12 is installed.

According to the method for assembling the gas turbine 1 in the embodiment described above, the clearance between the rotor shaft 12 and the seal ring holding ring 7 is properly adjusted, and the rotor shaft 12 is installed.

Figure 12E:
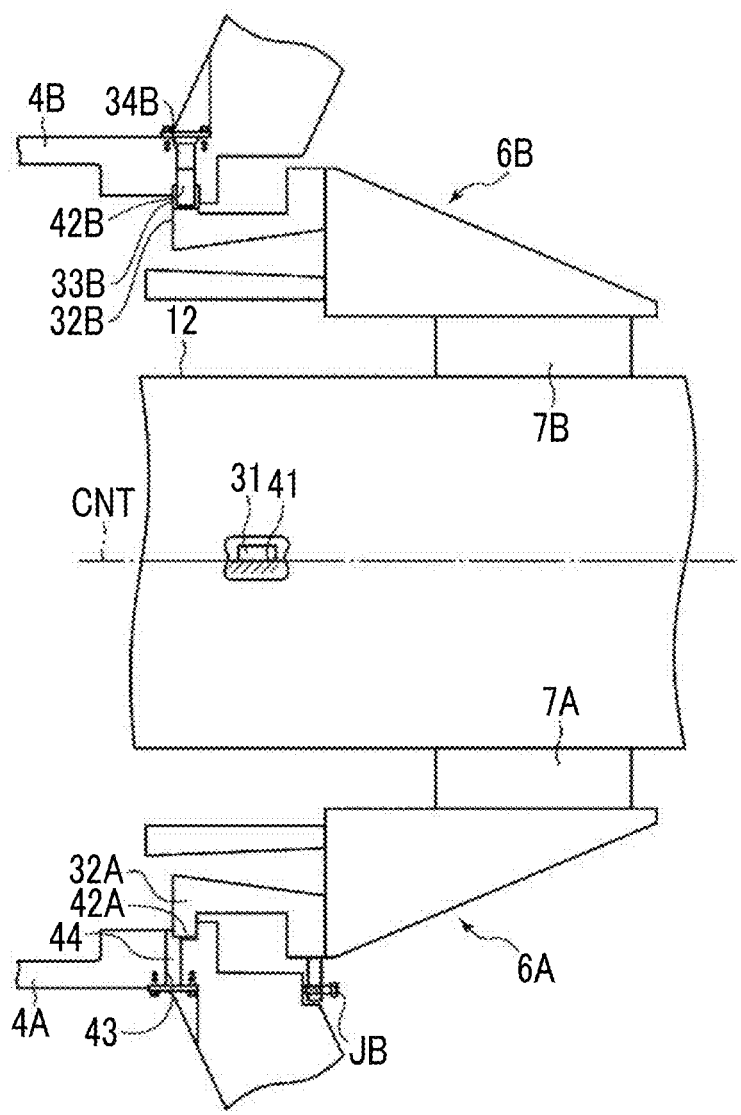
FIG. 12E is a schematic view schematically illustrating the method for assembling the gas turbine according to the embodiment, and is a view illustrating an installing step.
Figure 12F:
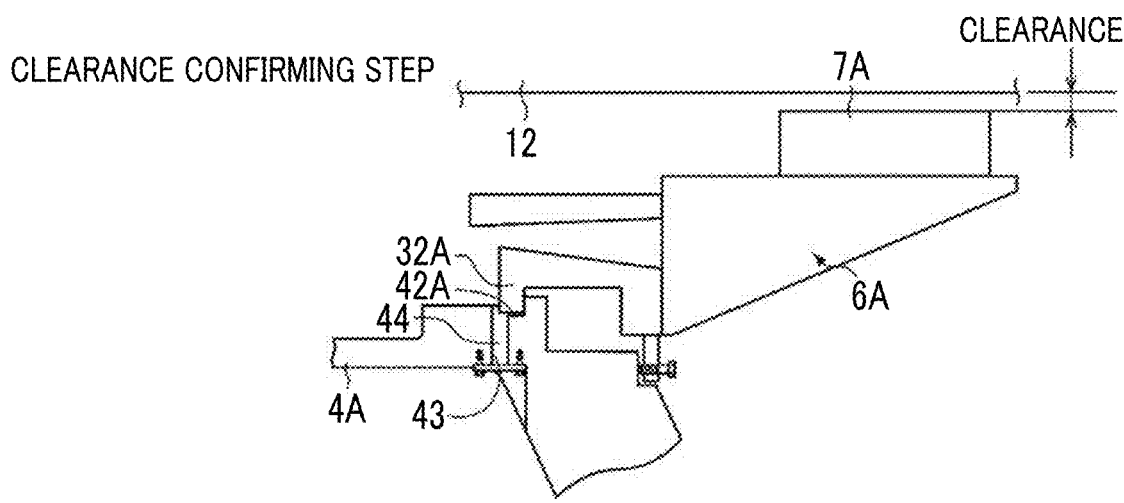
FIG. 12F is a schematic view schematically illustrating the method for assembling the gas turbine according to the embodiment, and is a view illustrating a clearance confirming step.

As illustrated in FIGS. 12E and 12F, the method for assembling the gas turbine 1 according to the embodiment further includes an installing step and a clearance confirming step.

As illustrated in FIG. 12E, the installing step is a step of installing the upper-half part 6B and the upper-half casing 4B of the cooling air manifold assembly 6. In the step of installing the upper-half casing 4B, the upper-half casing 4B is moved in the vertical direction so that the flange 32B is accommodated in the circumferential groove 42B. Then, the torque pin 34B is inserted into the torque pin hole 46B. In the installing step, the upper-half part 6B and the upper-half casing 4B of the cooling air manifold assembly 6 are installed, and the circumferential direction of the upper-half part 6B of the cooling air manifold assembly 6 is constrained with respect to the upper-half casing 4B.

As illustrated in FIG. 12F, the clearance confirming step is a step of measuring the clearance between the rotor shaft 12 and the seal ring holding ring 7 after the upper-half casing 4B is installed. After it is confirmed that the clearance is proper, a series of assembly steps is completed by removing the jack bolt JB from the bolt hole 351 provided in the jack bolt flange 35.

In a method for disassembling the gas turbine 1 according to the embodiment, a process may proceed to a step opposite to the step for the method for assembling the gas turbine 1. However, the clearance confirming step and the clearance measuring step are unnecessary.

The present invention is not limited to the above-described embodiments, and includes forms in which modifications are added to the above-described embodiments or forms in which the embodiments are combined as appropriate.

For example, in the gas turbine 1 described above, the cooling air manifold assembly 6 has been described as an example of the annular body. However, the annular body is not limited thereto. For example, the annular body also includes the cooling air manifold 3.

For example, in the above-described method for assembling the gas turbine 1, the lower-half part 6A and the upper-half part 6B of the cooling air manifold assembly 6 have been described as assembly units. However, the lower-half part 3A and the upper-half part 3B of the cooling air manifold 3 may be used as the assembly units. Thereafter, the lower-half part 51A of the intermediate shaft cover 51, the lower-half part 53A of the inner diffuser 53, the upper-half part 51B of the intermediate shaft cover 51, and the upper-half part 53B of the inner diffuser 53 may be assembled.

The contents described in each of the embodiments described above are understood as follows, for example.

According to an aspect of [1], there is provided the turbine assembly (gas turbine 1) including the first main body (lower-half part 6A of the cooling air manifold assembly 6) provided with the first protrusion (horizontal key 31) forming a portion of the annular body (cooling air manifold assembly 6) formed in an annular shape around the axis (CNT) and protruding outward in the radial direction of the annular body (cooling air manifold assembly 6) and in the horizontal direction, and the second protrusion (flange 32A) protruding outward in the radial direction from a position different from a position of the first protrusion (horizontal key 31) in the circumferential direction of the annular body (cooling air manifold assembly 6), and the first casing (lower-half casing 4A) provided with the support surface (horizontal support surface 41) supporting the first protrusion (horizontal key 31) from below, and the first recess (groove 45 defined by the circumferential groove 42A and the side pin 44) recessed outward in the radial direction and accommodating the second protrusion (flange 32A).

The dimension (W1) of the first recess (groove 45) in the axial direction of the annular body (cooling air manifold assembly 6) is larger than the dimension (W2) of the second protrusion (flange 32A).

In a state where the axis (CNT) of the annular body (cooling air manifold assembly 6) is disposed along the horizontal direction and the second protrusion (flange 32A) is accommodated in the first recess (groove 45), a gap is provided in the axial direction between the second protrusion (flange 32A) and the first recess (groove 45).

According to this configuration, the support surface (horizontal support surface 41) supports the first protrusion (horizontal key 31) from below. In this manner, the first casing (lower-half casing 4A) supports the first main body (lower-half part 6A of the cooling air manifold assembly 6) from below.

In addition, since the second protrusion (flange 32A) is accommodated in the first recess (groove 45), the first main body (lower-half part 6A of the cooling air manifold assembly 6) can be prevented from being tilted (posture change) due to a moment, and the posture of the first main body (lower-half part 6A of the cooling air manifold assembly 6) can be maintained while the turbine assembly (gas turbine 1) is assembled and disassembled. Therefore, it is not necessary to form a joining structure between the first main body (lower-half part 6A of the cooling air manifold assembly 6) and the first casing (lower-half casing 4A).

[2] According to another aspect of the turbine assembly (gas turbine 1), in the turbine assembly (gas turbine 1) according to [1], in a state where the axis (CNT) of the annular body (cooling air manifold assembly 6) is disposed along the horizontal direction and the second protrusion (flange 32A) is accommodated in the first recess (groove 45), the dimension (H) in the vertical direction of a portion of the second protrusion (flange 32A) accommodated in the first recess (groove 45) is larger than the dimension (ΔW) of the gap.

According to this configuration, a state where the second protrusion (flange 32A) is accommodated in the first recess (groove 45) is secured. Therefore, the first main body (lower-half part 6A of the cooling air manifold assembly 6) can be prevented from being tilted (posture change) due to a moment, and the posture of the first main body (lower-half part 6A of the cooling air manifold assembly 6) can be maintained while the turbine assembly (gas turbine 1) is assembled and disassembled. Therefore, the turbine assembly (gas turbine 1) can be easily assembled and disassembled.

[3] According to still another aspect of the turbine assembly (gas turbine 1), in the turbine assembly (gas turbine 1) according to [1] or [2], the first casing (lower-half casing 4A) is provided with the circumferential groove (42A) provided along the circumferential direction and accommodating the second protrusion (flange 32A), and the first hole (side pin hole 43) penetrating the first casing (lower-half casing 4A) in the radial direction.

The first hole (side pin hole 43) communicates with the circumferential groove (42A) inside the first hole (43) in the radial direction, and includes the side pin (44) inserted into the first hole (43) from the outside in the radial direction.

The dimension of the first recess (groove 45) in the axial direction is defined by the surface (44a1) facing the second protrusion (flange 32A) in the side pin (44) inserted into the first hole (43).

According to this configuration, the dimension of the first recess (groove 45) in the axial direction is defined by the surface (44a1) facing the second protrusion (flange 32A) in the side pin (44) inserted into the first hole (43). Therefore, the dimension of the first recess (groove 45) in the axial direction can be defined by inserting the side pin (44) into the first hole (43). In addition, the side pin (44) can be inserted into the first hole (43) after the second protrusion (flange 32A) is accommodated in the circumferential groove (42A). Therefore, the dimension of the first recess (groove 45) in the axial direction can be easily adjusted (cutting adjustment can be performed on the side pin (44). In addition, after the second protrusion (flange 32A) is accommodated in the circumferential groove (42A), the dimension of the first recess (groove 45) in the axial direction can be more finely set.

[4] According to still another aspect of the turbine assembly (gas turbine 1), in the turbine assembly (gas turbine 1) according to [3], the surface (44a1) facing a second protrusion (flange 32A) in the side pin (44) is provided in the cutout (44a) formed in the tip portion of the side pin (44).

According to this configuration, the surface (44a1) facing the second protrusion (flange 32A) in the side pin (44) is provided in the cutout (44a) formed in the tip portion of the side pin (44). Therefore, the dimension of the first recess (groove 45) in the axial direction is defined by the cutout (44a) formed in the tip portion of the side pin (44). In other words, since the side pin (44) is inserted into the first hole (43), the dimension of the first recess (groove 45) in the axial direction can be defined by one wall surface of the first recess (groove 45) and the surface (44a1) provided in the cutout (44a) of the side pin (44). In addition, the side pin (44) can be inserted into the first hole (side pin hole 43) after the second protrusion (flange 32A) is accommodated in the circumferential groove (42A). Therefore, it is possible to easily adjust the dimension of the first recess (groove 45) in the axial direction defined by the one wall surface of the circumferential groove (42A) and the surface (44a1) provided in the cutout (44a) of the side pin (44) (cutting adjustment can be performed on the surface provided in the cutout (44a) of the side pin (44)). In addition, after the second protrusion (flange 32A) is accommodated in the circumferential groove (42A), it is possible to more finely set the dimension of the first recess (groove 45) in the axial direction defined by the one wall surface of the circumferential groove (42A) and the surface (44a1) provided in the cutout (44a) of the side pin (44).

[5] According to still another aspect of the turbine assembly (gas turbine 1), in the turbine assembly (gas turbine 1) according to [3] or [4], the position of the first protrusion (horizontal key 31) in the axial direction is different from the position of the center of gravity of the first main body (lower-half part 6A of the cooling air manifold assembly 6) in the axial direction.

According to this configuration, when the turbine assembly (gas turbine 1) is assembled and disassembled, the second protrusion (flange 32A) interferes with the wall surface of the circumferential groove (42A). Therefore, the first main body (lower-half part 6A of the cooling air manifold assembly 6) can be prevented from being tilted (posture change) due to a moment, and the posture of the first main body (lower-half part 6A of the cooling air manifold assembly 6) can be maintained when the turbine assembly (gas turbine 1) is assembled and disassembled. Therefore, the turbine assembly (gas turbine 1) can be easily assembled and disassembled.

[6] According to still another aspect of the turbine assembly (gas turbine 1), in the turbine assembly (gas turbine 1) according to any one of [1] to [5], in a state where the axis (CNT) of the annular body (cooling air manifold assembly 6) is disposed along the horizontal direction and the second protrusion (flange 32A) is accommodated in the first recess (groove 45), a gap is provided in the vertical direction between the bottom surface of the second protrusion (flange 32A) and the bottom surface of the first recess (groove 45).

According to this configuration, a gap is provided in the vertical direction between the bottom surface of the second protrusion (flange 32A) and the bottom surface of the first recess (groove 45). Therefore, the bottom surface of the second protrusion (flange 32A) can be prevented from coming into contact with (interfering with) the bottom surface of the first recess (groove 45). In this manner, the posture of the first main body (lower-half part 6A of the cooling air manifold assembly 6) can be adjusted with respect to the first casing (lower-half casing 4A).

[7] According to still another aspect of the turbine assembly (gas turbine 1), in the turbine assembly (gas turbine 1) according to any one of [1] to [6], the second protrusion (flange 32A) is s provided below the first protrusion (horizontal key 31) in the vertical direction.

In the turbine assembly (gas turbine 1) according to [1], in order to effectively generate a moment that cancels the moment generated when the center of gravity of the first main body (lower-half part 6A of the cooling air manifold assembly 6) deviates from the first protrusion (horizontal key 31), it is desirable that the second protrusion (flange 32A) is provided at a position where the length of the arm from the first protrusion (horizontal key 31) serving as a fulcrum is sufficiently secured.

According to the turbine assembly (gas turbine 1) in [7], the second protrusion (flange 32A) is provided below the first protrusion (horizontal key 31) in the vertical direction. In this manner, the second protrusion (flange 32A) can be provided at the position where the length of the arm from the first protrusion (horizontal key 31) serving as the fulcrum is sufficiently secured. Therefore, it is possible to effectively generate the moment that cancels the moment generated when the center of gravity of the first main body (lower-half part 6A of the cooling air manifold assembly 6) deviates from the first protrusion (horizontal key 31).

[8] According to still another aspect of the turbine assembly (gas turbine 1), in the turbine assembly (gas turbine 1) according to any one of [1] to [7], the first casing (lower-half casing 4A) is provided with the second hole (torque pin hole 46A) penetrating in the radial direction, the first main body (lower-half part 6A of the cooling air manifold assembly 6) is provided with the second recess (torque pin groove 33A) recessed inward in the radial direction, and the torque pin (34A) inserted into the second hole (torque pin hole 46A) and the second recess (torque pin groove 33A) from the outside in the radial direction is provided.

According to this configuration, the torque pin (34A) is inserted into the second hole (torque pin hole 46A) and the second recess (torque pin groove 33A) from the outside in the radial direction of the annular body (lower-half part 6A of the cooling air manifold assembly 6). In this manner, the first main body (lower-half part 6A of the cooling air manifold assembly 6) is constrained in the circumferential direction of the annular body (lower-half part 6A of the cooling air manifold assembly) with respect to the first casing (lower-half casing 4A). The first main body (lower-half part 6A of the cooling air manifold assembly 6) can be fixed to the first casing (lower-half casing 4A) in the circumferential direction of the annular body (lower-half part 6A of the cooling air manifold assembly 6).

[9] According to still another aspect of the turbine assembly (gas turbine 1), the turbine assembly (gas turbine 1) according to any one of [1] to [8] further includes the second main body (upper-half part 6B of the cooling air manifold assembly 6) forming the annular body (cooling air manifold assembly 6) together with the first main body (lower-half part 6A of the cooling air manifold assembly 6).

According to this configuration, the annular body (cooling air manifold assembly 6) is completed by assembling the second main body (upper-half part 6B of the cooling air manifold assembly 6) to the first main body (lower-half part 6A of the cooling air manifold assembly 6).

[10] According to still another aspect of the turbine assembly (gas turbine 1), in the turbine assembly (gas turbine 1) according to [8], the second hole (torque pin hole 46A) communicates with the circumferential groove (42A) provided along the circumferential direction.

According to this configuration, when the torque pin (34A) is inserted into the second hole (torque pin hole 46A), the torque pin (34A) passes through the circumferential groove (42A), and is inserted into the second recess (torque pin groove 33A) provided in the first main body (lower-half part 6A of the cooling air manifold assembly 6).

[11] According to still another aspect of the turbine assembly (gas turbine 1), in the turbine assembly (gas turbine 1) according to [8] or [10], the second protrusion includes the flange (32A) extending in the circumferential direction, and the flange (32A) is provided with the second recess (torque pin groove 33A).

According to this configuration, when the torque pin (34A) is inserted into the second hole (torque pin hole 46A), the torque pin (34A) is inserted into the second recess (torque pin groove 33A) provided in the flange (32A).

[12] According to still another aspect of the turbine assembly (gas turbine 1), in the turbine assembly (gas turbine 1) according to any one of [1] to [11], the second protrusion (flange 32A) and the first recess (groove 45) are provided on both sides of the reference line (RL) intersecting with the axis (CNT) and extending in the vertical direction.

According to this configuration, the first main body (lower-half part 6A of the cooling air manifold assembly 6) is supported on both sides of the reference line (RL) intersecting with the axis (CNT) and extending in the vertical direction. Therefore, the first main body (lower-half part 6A of the cooling air manifold assembly 6) can be supported in a well-balanced manner.

[13] According to still another aspect of the turbine assembly (gas turbine 1), in the turbine assembly (gas turbine 1) according to any one of [1] to [12], the first protrusion (horizontal key 31) and the second protrusion (flange 32A) are provided at positions separated in the axial direction.

In the turbine assembly (gas turbine 1) according to [1], in order to allow thermal elongation, a dimensional difference (axial dimensional difference ΔW) between the first recess (groove 45) and the second protrusion (flange 32A) in the axial direction is required to some extent. However, when the dimensional difference (axial dimensional difference ΔW) between the first recess (groove 45) and the second protrusion (flange 32A) is increased, tilting (40)

caused by the moment of the annular body (cooling air manifold assembly 6) is also increased.

On the other hand, even when the dimensional difference (axial dimensional difference ΔW) between the first recess (groove 45) and the second protrusion (flange 32A) is the same, when the distance R from the first protrusion (horizontal key 31) to the second protrusion (flange 32A) is increased, tilting (40) caused by the moment of the annular body (cooling air manifold assembly 6) is decreased. In other words, even when tilting (40) caused by the moment of the annular body (cooling air manifold assembly 6) is constant, when the distance R from the first protrusion (horizontal key 31) to the second protrusion (flange 32A) is increased, the dimensional difference (axial dimensional difference ΔW) between the first recess (groove 45) and the second protrusion (flange 32A) can be increased.

According to the turbine assembly (gas turbine 1) in [13], the first protrusion (horizontal key 31) and the second protrusion (flange 32A) are provided at positions separated in the axial direction. In this manner, the distance R between the first protrusion (horizontal key 31) and the second protrusion (flange 32A) can be increased. Therefore, while a sufficient amount of the dimensional difference (axial dimensional difference ΔW) between the first recess (groove 45) and the second protrusion (flange 32A) is secured in the axial direction of the annular body (cooling air manifold assembly 6), tilting (40) caused by the moment of the annular body (cooling air manifold assembly 6) can be kept to or below an upper limit.

[14] According to still another aspect of the turbine assembly (gas turbine 1), in the turbine assembly (gas turbine 1) according to [11], the flange (32A) is provided with the plurality of slits (36A) in the circumferential direction at positions different from the position of the second recess (torque pin groove 33A).

According to this configuration, the flange (32A) is provided with the plurality of slits (36A) in the circumferential direction of the annular body (cooling air manifold assembly 6) at positions different from the position of the second recess (torque pin groove 33A). Therefore, oval deformation of the annular body (cooling air manifold 3) can be reduced.

[15] According to still another aspect of the turbine assembly (gas turbine 1), in the turbine assembly (gas turbine 1) according to any one of [1] to [14], in the first main body (lower-half part 6A of the cooling air manifold assembly 6), the third protrusion (jack bolt flange 35) protruding outward in the radial direction from the first main body (lower-half part 6A of the cooling air manifold assembly 6) is provided at a position different from the position of the second protrusion (flange 32A) in the axial direction.

The first surface (35a) facing the second protrusion (flange 32A) side in the axial direction, which is a side where the second protrusion (the flange 32A) is present when viewed from the third protrusion (jack bolt flange 35) in the axial direction, is provided in the third protrusion (jack bolt flange 35).

The second surface (47a) facing a side opposite to the second protrusion (flange 32A) side in the axial direction and facing the first surface (35a) in the axial direction is provided in the first casing (lower-half casing 4A).

According to this configuration, the posture of the first main body (lower-half part 6A of the cooling air manifold assembly 6) can be adjusted by adjusting the distance of the annular body (cooling air manifold assembly 6) in the axial direction between the first surface (35a) provided in the third protrusion (jack bolt flange 35) and the second surface (47a) provided in the first casing (lower-half casing 4A).

[16] According to still another aspect of the turbine assembly (gas turbine 1), the turbine assembly (gas turbine 1) according to further includes the expanding/contracting member (for example, a hydraulic jack) installed between the first surface (35a) and the second surface (47a) and configured to change the distance in the axial direction between the first surface (35a) and the second surface (47a).

According to this configuration, the posture of the first main body (lower-half part 6A of the cooling air manifold assembly 6) can be adjusted in such a manner that the expanding/contracting member (for example, the hydraulic jack) adjusts the distance in the axial direction between the first surface (35a) provided in the third protrusion (jack bolt flange 35) and the second surface (47a) provided in the first casing (lower-half casing 4A).

[17] According to still another aspect of the turbine assembly (gas turbine 1), in the turbine assembly (gas turbine 1) according to any one of [1] to [16], the annular body includes the cooling air manifold assembly (6) including at least the intermediate shaft cover (51) and the cooling air manifold (3) of the gas turbine.

According to this configuration, the cooling air manifold assembly (6) can be easily installed in the first casing (lower-half casing 4A).

According to an aspect of [18], there is provided the method for assembling the turbine assembly (gas turbine 1) including the first main body (lower-half part 6A of the cooling air manifold assembly 6) provided with the first protrusion (horizontal key 31) forming a portion of the annular body (cooling air manifold assembly 6) formed in an annular shape around the axis (CNT) and protruding outward in the radial direction of the annular body (cooling air manifold assembly 6) and in the horizontal direction, and the second protrusion (flange 32A) protruding outward in the radial direction from a position different from a position of the first protrusion (horizontal key 31) in the circumferential direction of the annular body (cooling air manifold assembly 6), and the first casing (lower-half casing 4A) provided with the support surface (horizontal support surface 41) supporting the first protrusion (horizontal key 31) from below, and the circumferential groove (42A) provided along the circumferential direction, recessed outward in the radial direction, and accommodating the second protrusion (flange 32A).

The method for assembling the turbine assembly (gas turbine 1) includes a moving step of moving the first main body (lower-half part 6A of the cooling air manifold assembly 6) in the vertical direction so that the first protrusion (horizontal key 31) is supported from below by the support surface (horizontal support surface 41) and the second protrusion (flange 32A) is accommodated in the circumferential groove (42A), and a rotating step of rotating the first main body (lower-half part 6A of the cooling air manifold assembly 6) around the first protrusion (horizontal key 31) by applying an axial force to the first main body (lower-half part 6A of the cooling air manifold assembly 6) at a position below the first protrusion (horizontal key 31) in the vertical direction so that the second protrusion (flange 32A) comes into contact with the wall surface (42a1) of the circumferential groove (42A).

According to this method, the first main body (lower-half part 6A of the cooling air manifold assembly 6) is moved in the vertical direction so that the first protrusion (horizontal key 31) is supported from below by the support surface (horizontal support surface 41) and the second protrusion (flange is 32A) accommodated in the circumferential groove (42A). In this manner, the first casing (lower-half casing 4A)

supports the first main body (lower-half part 6A of the cooling air manifold assembly 6) from below.

In addition, the first main body (lower-half part 6A of the cooling air manifold assembly 6) is rotated so that the second protrusion (flange 32A) comes into contact with the wall surface of the circumferential groove (42A) while the turbine assembly (gas turbine 1) is assembled. In this manner, the posture of the first main body (lower-half part 6A of the cooling air manifold assembly 6) is properly maintained. Therefore, the turbine assembly (gas turbine 1) can be easily assembled.

According to an aspect of of the method for assembling the turbine assembly, in the method for assembling the turbine assembly (gas turbine 1) according to the aspect of [18], the first casing (lower-half casing 4A) is provided with the first hole (43) penetrating the first casing (lower-half casing 4A) in the radial direction, the first hole (43) communicates with the circumferential groove (42A) inside the first hole (43) in the radial direction, after the rotating step, the side pin (44) is inserted into the first hole (43) from the outside in the radial direction, and the method further includes a first recess defining step of defining the dimension in the axial direction of the annular body of the first recess (groove 45) in which the second protrusion (flange 32A) is accommodated by the surface (44a1) facing the second protrusion (flange 32A) in the side pin (44) inserted into the first hole (43).

According to this method, since the side pin (44) is inserted into the first hole (43), it is possible to define the dimension of the annular body (cooling air manifold assembly 6) of the first recess (groove 45) in the axial direction in which the second protrusion (flange 32A) is accommodated. In addition, the side pin (44) can be inserted into the first hole (43) after the second protrusion (flange 32A) is accommodated in the circumferential groove (42A). Therefore, the dimension of the first recess (groove 45) in the axial direction can be easily adjusted (cutting adjustment can be performed on the side pin (44). In addition, after the second protrusion (flange 32A) is accommodated in the circumferential groove (42A), the dimension of the first recess (groove 45) in the axial direction can be more finely set.

REFERENCE SIGNS LIST

1: Gas turbine
12: Rotor shaft
121, 123: Bearing portion
13: Compressor
131: Compressor casing
133: Compressor stator vane
135: Compressor rotor blade
137: Inlet
139: Discharge port
15: Combustor
151: Combustor casing
153: Combustion cylinder
155: Transition piece
157: Air supply port
17: Turbine
171: Turbine casing
173: Stator vane assembly
175: Turbine rotor blade
177: Exhaust hood
179: Exhaust Diffuser
3: Cooling air manifold
3A: Lower-half part
3B: Upper-half part
31: Horizontal key
32A, 32B: Flange
33A, 33B: Torque pin groove
34A, 34B: Torque pin
35: Jack bolt flange
35a: First surface
351: Bolt hole
36A, 36B: Slit
4: Casing
4A: Lower-half casing
4B: Upper-half casing
41: Horizontal support surface
42A, 42B: Circumferential groove
42a1, 42a2: Wall surface
43: Side pin hole
44: Side pin
44a: Cutout
44a1: Surface
45: Groove
46A, 46B: Torque pin hole
47a: Second surface
51: Intermediate shaft cover
51A: Lower-half part
51B: Upper-half part
53: Inner diffuser
53A: Lower-half part
53B: Upper-half part
6: Cooling air manifold assembly
6A: Lower-half part
6B: Upper-half part
7: Seal ring holding ring
7A: Lower-half part
7B: Upper-half part
AX: Axis of rotor shaft
CNT: Axis
JB: Jack bolt
RL: Reference line

The invention claimed is:

1. A turbine assembly comprising:
a first main body which is a lower divided structure of an annular body formed in an annular shape around an axis, the annular body being divided into the lower divided structure of the annular body and an upper divided structure of the annular body while a horizontal plane passing through the axis is set as a boundary, wherein the lower divided structure of the annular body is configured to be assembled with the upper divided structure of the annular body to form the annular body, the first main body being provided with
a first protrusion protruding outward in a radial direction of the annular body and in a horizontal direction, and
a second protrusion protruding outward in the radial direction from a position different from a position of the first protrusion in a circumferential direction of the annular body; and
a first casing which is a lower divided structure of an annular casing accommodating the annular body, the annular casing being divided into the lower divided structure of the annular casing and an upper divided structure of the annular casing while the horizontal plane is set as a boundary, wherein the lower divided structure of the annular casing is configured to be assembled with the upper divided structure of the annular casing to form the annular casing, the first casing being provided with a support surface supporting the first protrusion from below, and a first recess recessed outward in the radial direction and accommodating the second protrusion, wherein a dimension of the first recess in an axial direction of the annular body is larger than a dimension of the second protrusion, and in a state where the axis of the annular body is disposed along the horizontal direction and the second protrusion is accommodated in the first recess, a gap is provided in the axial direction between the first recess and an entirety of the second protrusion inserted into the first recess.

2. The turbine assembly according to claim 1,
wherein in a state where the axis of the annular body is disposed along the horizontal direction and the second protrusion is accommodated in the first recess, a dimension in a vertical direction of a portion of the second protrusion accommodated in the first recess is larger than a dimension of the gap.

3. The turbine assembly according to claim 2,
wherein the first casing is provided with
a circumferential groove provided along the circumferential direction and accommodating the second protrusion, and
a first hole penetrating the first casing in the radial direction,
the first hole communicates with the circumferential groove inside the first hole in the radial direction, and includes a side pin inserted into the first hole from the outside in the radial direction, and
a dimension of the first recess in the axial direction is defined by a surface facing the second protrusion in the side pin inserted into the first hole.

4. The turbine assembly according to claim 3,
wherein the surface facing a second protrusion in the side pin is provided in a cutout formed in a tip portion of the side pin.

5. The turbine assembly according to claim 3,
wherein a position of the first protrusion in the axial direction is different from a position of a center of gravity of the first main body in the axial direction.

6. The turbine assembly according to claim 2,
wherein in a state where the axis of the annular body is disposed along the horizontal direction and the second protrusion is accommodated in the first recess, a gap is provided in a vertical direction between a bottom surface of the second protrusion and a bottom surface of the first recess.

7. The turbine assembly according to claim 2,
wherein the second protrusion is provided below the first protrusion in a vertical direction.

8. The turbine assembly according to claim 2,
wherein the first casing is provided with a second hole penetrating in the radial direction, the first main body is provided with a second recess recessed inward in the radial direction, and
a torque pin inserted into the second hole and the second recess from the outside in the radial direction is provided.

9. The turbine assembly according to claim 2, further comprising:
a second main body which is the upper divided structure of the annular body, wherein the first main body and the second main body are assembled to form the annular body.

10. The turbine assembly according to claim 8,
wherein the second hole communicates with a circumferential groove provided along the circumferential direction.

11. The turbine assembly according to claim 8,
wherein the second protrusion includes a flange extending in the circumferential direction, and
the flange is provided with the second recess.

12. The turbine assembly according to claim 2,
wherein the second protrusion and the first recess are provided on both sides of a reference line intersecting with the axis and extending in a vertical direction.

13. The turbine assembly according to claim 2,
wherein the first protrusion and the second protrusion are provided at positions separated in the axial direction.

14. The turbine assembly according to claim 11,
wherein the flange is provided with a plurality of slits in the circumferential direction at positions different from a position of the second recess.

15. The turbine assembly according to claim 2,
wherein in the first main body, a third protrusion protruding outward in the radial direction from the first main body is provided at a position different from a position of the second protrusion in the axial direction,
a first surface facing a second protrusion side in the axial direction, which is a side where the second protrusion is present when viewed from the third protrusion in the axial direction, is provided in the third protrusion, and
a second surface facing a side opposite to the second protrusion side in the axial direction and facing the first surface in the axial direction is provided in the first casing.

16. The turbine assembly according to claim 15, further comprising:
an expanding/contracting member installed between the first surface and the second surface and configured to change a distance in the axial direction between the first surface and the second surface.

17. The turbine assembly according to claim 2,
wherein the annular body includes a cooling air manifold assembly including at least an intermediate shaft cover and a cooling air manifold of a gas turbine.

18. The turbine assembly according to claim 1, wherein the support surface is provided on the horizontal plane.

* * * * *